US007859956B2

(12) United States Patent
Shibata et al.

(10) Patent No.: US 7,859,956 B2
(45) Date of Patent: Dec. 28, 2010

(54) IMAGE PROCESSING DEVICE AND IMAGE PROCESSING METHOD, INFORMATION PROCESSING DEVICE AND INFORMATION PROCESSING METHOD, INFORMATION RECORDING DEVICE AND INFORMATION RECORDING METHOD, INFORMATION REPRODUCING DEVICE AND INFORMATION REPRODUCING METHOD, STORAGE MEDIUM, AND PROGRAM

(75) Inventors: Shojiro Shibata, Kanagawa (JP); Goro Kato, Kanagawa (JP); Hiromichi Ueno, Kanagawa (JP)

(73) Assignee: Sony Corporation, Tokyo (JP)

( * ) Notice: Subject to any disclaimer, the term of this patent is extended or adjusted under 35 U.S.C. 154(b) by 65 days.

(21) Appl. No.: 12/423,859

(22) Filed: Apr. 15, 2009

(65) Prior Publication Data

US 2009/0202162 A1    Aug. 13, 2009

Related U.S. Application Data

(63) Continuation of application No. 10/556,416, filed as application No. PCT/JP2004/006857 on May 14, 2004, now Pat. No. 7,606,124.

(30) Foreign Application Priority Data

May 14, 2003    (JP) .............................. 2003-135350

(51) Int. Cl.
   *G11B 5/09*    (2006.01)
(52) U.S. Cl. .................. 369/47.1; 369/47.15; 369/59.23
(58) Field of Classification Search ........................ None
   See application file for complete search history.

(56) References Cited

U.S. PATENT DOCUMENTS 4,292,651 A    9/1981    Kretz et al.

(Continued)

FOREIGN PATENT DOCUMENTS

EP    0 349 847    1/1990

(Continued)

OTHER PUBLICATIONS

AT&T Technical Journal, vol. 72, No. 1, Feb. 1993, New York, pp. 67-89, Aravind et al., "Image and Video Coding Standards".

(Continued)

*Primary Examiner*—Muhammad N. Edun
(74) *Attorney, Agent, or Firm*—Frommer Lawrence & Haug LLP; William S. Frommer

(57) ABSTRACT

The present invention allows usable information to be selected by comparing information regarding encoding with conditions regarding encoding processing. When delay modes, picture structures, and pulldown modes do not match each other between previous encoding time and re-encoding time, parameters are not reused. When they match and image frames do not match, a picture type is reused. When a bit rate in the previous encoding is smaller than that in the current encoding and a chroma format is larger than the current chroma format, a picture type and a motion vector are reused. When the conditions are not satisfied, parameters are supplied and received and a determination is made as to whether or not chroma formats match each other. When the chroma formats do not match each other, picture-type information, motion-vector information, and quantization-value information are reused. When the chroma formats match each other, stream data input to a decoding unit is output. The present invention can be applied to an encoding unit, an encoding device, or a transcoder.

1 Claim, 17 Drawing Sheets

U.S. PATENT DOCUMENTS

| | | | |
|---|---|---|---|
| 4,825,285 | A | 4/1989 | Speidel et al. |
| 4,893,317 | A | 1/1990 | Critchlow et al. |
| 5,148,272 | A | 9/1992 | Alampora |
| 5,212,549 | A | 5/1993 | Ng et al. |
| 5,260,783 | A | 11/1993 | Dixit |
| 5,289,190 | A | 2/1994 | Shimoda et al. |
| 5,291,484 | A | 3/1994 | Tomita et al. |
| 5,327,520 | A | 7/1994 | Chen |
| 5,452,006 | A | 9/1995 | Auld |
| 5,473,380 | A | 12/1995 | Tahara |
| 5,479,212 | A | 12/1995 | Kurobe et al. |
| 5,500,678 | A | 3/1996 | Puri |
| 5,532,746 | A | 7/1996 | Chang |
| 5,534,937 | A | 7/1996 | Zhu et al. |
| 5,537,440 | A | 7/1996 | Eyuboglu et al. |
| 5,541,852 | A | 7/1996 | Eyuboglu et al. |
| 5,543,847 | A | 8/1996 | Kato |
| 5,544,266 | A | 8/1996 | Koppelmans et al. |
| 5,563,593 | A | 10/1996 | Puri |
| 5,657,086 | A | 8/1997 | Tahara et al. |
| 5,715,009 | A | 2/1998 | Tahara et al. |
| 5,729,293 | A | 3/1998 | Keesman |
| 5,754,235 | A | 5/1998 | Urano et al. |
| 5,754,698 | A | 5/1998 | Suzuki et al. |
| 5,757,421 | A | 5/1998 | Kato et al. |
| 5,774,206 | A | 6/1998 | Wasserman et al. |
| 5,805,224 | A | 9/1998 | Keesman et al. |
| 5,812,194 | A | 9/1998 | Wilkinson |
| 5,831,688 | A | 11/1998 | Yamada et al. |
| 5,870,146 | A | 2/1999 | Zhu |
| 5,889,561 | A | 3/1999 | Kwok et al. |
| 5,907,374 | A | 5/1999 | Liu |
| 5,940,130 | A | 8/1999 | Nilsson et al. |
| 6,081,295 | A | 6/2000 | Adolph et al. |
| 6,088,393 | A | 7/2000 | Knee et al. |
| 6,100,940 | A | 8/2000 | Dieterich |
| 6,125,140 | A | 9/2000 | Wilkinson |
| 6,160,844 | A | 12/2000 | Wilkinson |
| 6,163,573 | A | 12/2000 | Mihara |
| 6,167,084 | A | 12/2000 | Wang et al. |
| 6,201,844 | B1 | 3/2001 | Bailleul |
| 6,285,716 | B1 | 9/2001 | Knee et al. |
| 6,369,722 | B1 | 4/2002 | Murgia et al. |
| 6,418,167 | B1 | 7/2002 | Kato et al. |
| 6,442,207 | B1 | 8/2002 | Nishikawa et al. |
| 6,493,384 | B1 | 12/2002 | Mihara |
| 6,556,627 | B2 | 4/2003 | Kitamura et al. |
| 6,560,282 | B2 | 5/2003 | Tahara et al. |
| 6,567,128 | B1 | 5/2003 | Webb et al. |
| 6,574,274 | B2 | 6/2003 | Obata et al. |
| 6,661,843 | B2 | 12/2003 | Kato et al. |
| 6,704,363 | B1 | 3/2004 | Kim |
| 6,839,384 | B2 | 1/2005 | Yamada |
| 6,856,650 | B1 | 2/2005 | Takishima et al. |
| 6,987,535 | B1 | 1/2006 | Matsugu et al. |
| 7,236,526 | B1 | 6/2007 | Kitamura |
| 7,257,264 | B2 | 8/2007 | Nakayama et al. |
| 2003/0016755 | A1 | 1/2003 | Tahara et al. |
| 2003/0128766 | A1 | 7/2003 | Tahara et al. |
| 2004/0101041 | A1 | 5/2004 | Alexandre et al. |

FOREIGN PATENT DOCUMENTS

| | | |
|---|---|---|
| EP | 0 618 734 | 10/1994 |
| EP | 0 710 030 | 5/1996 |
| EP | 0 889 650 | 1/1999 |
| EP | 0 942 605 | 9/1999 |
| FR | 2 809 573 | 11/2001 |
| GB | 2318246 | 4/1998 |
| GB | 2 333 656 | 7/1999 |
| JP | 6 70178 | 3/1994 |
| JP | 7 107461 | 4/1995 |
| JP | 7-288804 | 10/1995 |
| JP | 8-98181 | 4/1996 |
| JP | 8-111870 | 4/1996 |
| JP | 8-130743 | 5/1996 |
| JP | 10 32829 | 2/1998 |
| JP | 10 32830 | 2/1998 |
| JP | 10 503895 | 4/1998 |
| JP | 10-136386 | 5/1998 |
| JP | 11-74798 | 3/1999 |
| JP | 2000-59784 | 2/2000 |
| JP | 2000-341686 | 12/2000 |
| JP | 2001-169292 | 6/2001 |
| JP | 3694888 | 7/2005 |
| JP | 2005-304065 | 10/2005 |
| WO | WO 95 35628 | 12/1995 |
| WO | WO 96 01023 | 1/1996 |
| WO | WO 96 24222 | 8/1996 |
| WO | WO 96 25823 | 8/1996 |
| WO | WO 98 03017 | 1/1998 |
| WO | WO 98 51077 | 11/1998 |
| WO | WO 99 38314 | 7/1999 |

OTHER PUBLICATIONS

Oliver Morgan (SMPTE): "SMPTE 328M Video Elementary Stream Editing Information" Joint Video Team (JVT) of ISO/IEC MPEG & ITU-T VCEG(ISO/IEC JTC1/SC29/WG11 and ITU-T SG16 06), XX, XX, No. M5924, Mar. 14, 2000, XP030035101.

Transcoder Architectures For Video coding, Bjork and Christoopoulos, Ericsson Telecom AB, Compression Lab, HF/ETX/PN/XML, 9-12625 Stockholm, Sweden, IEEE Transcoder on Consumer Electronics, vol. 44, No. 1, pp. 88-98, Feb. 1998.

D. G. Morrison et al., "Reduction of the bit-rate of compressed video while in its coded form," 6$^{th}$ International Workshop on Packet Video, 1994, D17.1-D17.4.

Gertjan Keesman et al., "Transcoding of MPED bitstreams," Signal Processing: Image Communication, Elsevier Science B.V., Sep. 1996, vol. 8, No. 6, pp. 481-500.

P. N. Tudor et al., "Real-Time Transcoding of MPEG-2 Video Bit Streams," BBC R&D—IBC '97, Amsterdam <http://www.bbc.co.uk/rd/pubs/papers/pdffiles/ibc97ptw.pdf>.

Keiichi Hibi, "A Study on Coding Control Scheme for Video Transcoding," PCSJ93, Oct. 4, 1993, pp. 27-28.

FIG. 7

| compressed_stream_format_of_MPEG_2_re_coding_set(){ | No. of bits | Mnemonic |
|---|---|---|
| next_start_code() | | |
| sequence_header() | | |
| sequence_extension() | | |
| extension_and_user_data(0) | | |
| if (nextbits() == group_start_code){ | | |
| group_of_pictures_header() | | |
| extension_and_user_data(1) | | |
| } | | |
| picture_header() | | |
| picture_coding_extension() | | |
| re-coding_stream_info() | | |
| extensions_and_user_data(2) | | |
| if (I red_bw_flag || (red_bw_indicator <=2)) | | |
| picture_data() | | |
| sequence_end_code | 32 | bslbf |
| } | | |

FIG. 8

| Stream_Information_Header ||||||||||
|---|---|---|---|---|---|---|---|---|---|
| Encoder_Serial_Number |||| 1 | Encoder_ID |||||
| 1 | 0x00 || 1 | Time_Second | 1 | Time_Minute || 1 | Time_Hour |
| 1 | 0x00 || 1 | Time_Day | 1 | Time_Month || 1 | Time_Year |
| 1 | Rsv | GenC | 1 | 1 | Continuity_Counter |||||
| 1 | pic_type || temporal_reference | 1 | reuse_level || error_f | 1 1 1 1 ||
| A | extension_start_code_flags ||| 1 | other || Reserved |||
| 1 1 | B | C | 1 1 | ·num_of_picture_bytes(22) |||| 1 1 ||
| bit_rate_extension(12) |||| 1 | bit_rate_value(18) |||| 1 |

IMAGE PROCESSING DEVICE AND IMAGE PROCESSING METHOD, INFORMATION PROCESSING DEVICE AND INFORMATION PROCESSING METHOD, INFORMATION RECORDING DEVICE AND INFORMATION RECORDING METHOD, INFORMATION REPRODUCING DEVICE AND INFORMATION REPRODUCING METHOD, STORAGE MEDIUM, AND PROGRAM

This is a continuation of U.S. application Ser. No. 10/556,416, filed Aug. 7, 2006 under 35 USC 371 from International Application PCT/JP2004/006857, with a claim of priority under 35 USC 119 to Japanese Application 2003-135350, filed in Japan on May 14, 2003, the entirety thereof being incorporated herein by reference.

TECHNICAL FIELD

The present invention relates to image processing devices and image processing methods, information processing devices and information processing methods, information recording devices and information recording methods, information reproducing devices and information reproducing methods, storage media, and programs. In particular, the present invention relates to an image processing device and an image processing method, an information processing device and an information processing method, an information recording device and an information recording method, an information reproducing device and an information reproducing method, a storage medium, and a program which are preferable for use in a case in which re-encoding is performed using information regarding encoding performed in the past on corresponding data.

BACKGROUND ART

For example, in systems that transmit moving-image signals to a remote place, for example, in video conference systems and videophone systems, the line correlation and inter-frame correlation of video signals are used, in order to efficiently use a transmission path, to compress and encode image signals.

When image signals are compressed and encoded, the encoding is performed so that a bit stream generated has a predetermined bit rate. However, in an actual operation, a need for converting the bit rate of bit streams may arise due to the problem of a transmission path.

For example, when transmitted image signals are edited at a broadcast station, the editing is performed at every second. It is, therefore, desirable that the image information of a frame be independent from the image information of another frame. Accordingly, in order to ensure that the image quality does not deteriorate even with transfer at a low bit rate (e.g., 3 to 9 Mbps), there is a need to perform mutual conversion between a long GOP (Group of Picture) and a short GOP, between of which information is correlated. The long GOP has a large number of frames constituting a GOP, which is a combination of frames, and the short GOP has a small number of frames constituting a GOP and is transferred at a high bit rate (18 to 50 Mbps).

A system that is capable of editing frames, for example, by encoding the stream data of a long GOP transmitted/received through a transmission path into the stream data of all intra-frames (All Intra), which are included in a short GOP, will be described with reference to FIG. 1.

The stream data of a long GOP suitable for transmission is transmitted to a transmission path 1.

In a transcoder 2, the decoding unit 21 temporarily decodes the stream data of an MPEG Long GOP, the stream data being supplied through the transmission path 1, and an encoding unit 22 encodes the stream data so that it becomes all intra-frames (All Intra) and outputs the encoded all intra stream data (an SDTI CP (Serial Data Transport Interface-Contents Package) stream) to a frame editing device 3 having an SDTI CP interface.

The stream data that has been subjected to frame editing by the frame editing unit 3 is supplied to a transcoder 4. In the transcoder 4, a decoding unit 31 temporarily decodes the supplied all-intra stream data, and then an encoding unit 32 encodes the stream data so that it becomes an MPEG Long GOP and outputs the stream data of the encoded MPEG long GOP to a predetermined data transmission destination thorough the transmission path 1.

A system that is capable of encoding an input image into an MPEG long GOP at a high bit rate and decoding it so that it is re-encoded into a low-bit-rate MPEG long GOP will be described with reference to FIG. 2.

In a transcoder 51, a decoding unit 61 temporarily decodes a supplied uncompressed input image and an encoding unit 62 then encodes the input data so that it becomes a high-bit-rate MPEG long GOP and outputs the stream data of the encoded MPEG Long GOP. In a transcoder 52, a decoding unit 71 temporarily decodes the supplied high-bit-rate MPEG long GOP, and an encoding unit 72 then encodes the long GOP so as to provide a low-bit-rate MPEG long GOP and outputs the stream data of the encoded low-bit-rate MPEG long GOP to a predetermined data transmission destination through the transmission path 1.

When the encoding and decoding of image information are repeated as described above, a change in an encoding parameter used at every encoding operation causes the image information to deteriorate. In order to prevent the image-information deterioration, Japanese Unexamined Patent Application Publication No. 2000-059788 discloses a technology that can suppress the image deterioration, involved in the re-encoding, by using encoding history information inserted in a user data area in a bit-stream picture layer.

For example, a case in which encoding history information is used in a system that is capable of converting an MPEG long GOP into a short GOP that allows frame editing will be described with reference to FIG. 3. Units corresponding to those in FIG. 1 are denoted with the same reference numerals and the descriptions thereof are omitted as appropriate.

That is, a transcoder 101 receives an MPEG long GOP through the transmission path 1.

Since an MPEG long GOP is constituted by three types of pictures (I pictures, P pictures, and B pictures) which have different encoding formats, video data encoded therefrom also has an I-picture, P-picture, or B-picture format, depending on a frame. Thus, in a case in which the video data is re-encoded using an MPEG long GOP, when encoding for another picture type is performed on video data having the I picture, P picture, or B picture format, image deterioration may occur. For example, when video data for a B picture, which is more likely to cause distortion than an I picture and P picture, is encoded as an I picture before decoding, image deterioration occurs since pictures around it predicts the I picture as a reference image to perform encoding.

In order to prevent such image degradation caused by re-encoding, for example, when the transcoder 101 receives stream data encoded in the past by another transcoder through the transmission path 1, a decoding unit 111 temporarily decodes the stream data of the supplied MPEG long GOP and an encoding unit 112 then performs encoding such that all of the decoded stream data becomes intra-frames. In this case, parameters of encoding performed in the past, i.e., parameters such as a picture type or quantization value of encoding of encoded stream supplied to the decoding unit 111, are attached to the all-intra encoded stream, as history information (history data) based on SMPTE (Society of Motion Picture and Television Engineers) 328, and the resulting stream is supplied to the frame editing device 3.

The stream data that has been subjected to frame editing by the frame editing unit 3 is supplied to a transcoder 102 again. In the transcoder 102, a decoding unit 121 decodes the supplied all-intra stream data with the history information. An encoding unit 122 uses necessary parameters, such as a picture type and a quantization value, contained in the decoded history information to re-encode the data into a long GOP, and outputs the long GOP.

A case in which image deterioration is prevented for re-encoding in a system that can encode uncompressed data into an MPEG long GOP at a high bit rate and re-encode, by decoding, the GOP into a low-bit-rate long GOP, as described with reference to FIG. 2, will be described with reference to FIG. 4. Units corresponding to those in the case of FIG. 2 are denoted with the same reference numerals and the descriptions thereof are omitted as appropriate.

That is, upon receiving the stream data of the MPEG long GOP encoded by the transducer 51, a transcoder 131 obtains necessary encoding parameters when a decoding unit 141 decodes a high-bit-rate MPEG long GOP, and supplies decoded video data and the obtained encoding parameters to an encoding unit 142. The encoding unit 142 uses the supplied encoding parameters to encode the video data so that it becomes a low-bit-rate MPEG long GOP and outputs the steam data of the encoded low-bit-rate MPEG long GOP.

As described above, reusing past-encoding information (picture-layer and macroblock-layer parameters, such as a picture type, motion vector, quantization value in encoding performed in the past), by using the history information or encoding parameters, to perform encoding makes it possible to prevent image deterioration. However, for example, a stream that is different in a bit rate, image frame, or chroma format from a stream during the previous encoding processing may be replaced or inserted through editing. In such a case, re-encoding cannot be performed by reusing all encoding information from the picture layer to the macroblock layer.

DISCLOSURE OF INVENTION

The present invention has been made in view of such a situation, and allows reusable information to be selected in accordance with the state of image data to be encoded.

An image processing device of the present invention includes: obtaining means for obtaining information regarding encoding performed in the past on the image data; and controlling means for controlling encoding processing to be executed on the image data by the image processing device, by selecting information usable in the encoding processing from the information regarding the encoding, based on the information regarding the encoding and conditions regarding the encoding processing, the information regarding the encoding being obtained by the obtaining means.

When a delay mode, a picture structure, and a pulldown mode in the past encoding which are described in the information regarding the encoding conform to the conditions regarding the encoding processing, the controlling means can use picture type information described in the information regarding the encoding to control the encoding processing.

When an image frame in the past encoding, the image frame being described in the information regarding the encoding, and an image frame in the encoding processing match each other in position and size, the controlling means can further use motion vector information described in the information regarding the encoding to control the encoding processing.

When a bit rate in the past encoding, the bit rate being described in the information regarding the encoding, is smaller than a bit rate in the encoding processing and a chroma format in the past encoding, the chroma format being described in the information regarding the encoding, is larger than or equal to a chroma format in the encoding processing, the controlling means can further use quantization-value information described in the information regarding the encoding to control the encoding processing.

The image processing device can further include outputting means for outputting, in response to first encoded data supplied to another image processing device that decoded the image data and second encoded data generated in the encoding processing controlled by the controlling means, the first encoded data or the second encoded data. When a delay mode, a picture structure, a pulldown mode, a position and a size of an image frame, and a chroma format in the past encoding which are described in the information regarding the encoding conform to the conditions regarding the encoding processing and a bit rate in the past encoding, the bit rate being described in the information regarding the encoding, is smaller than a bit rate in the encoding processing, the controlling means can further control the outputting means to output the first encoded data.

An image processing method of the present invention includes: obtaining information regarding encoding performed in the past on image data; selecting information usable in the encoding processing from the information regarding the encoding, based on the obtained information regarding the encoding and conditions regarding encoding processing to be executed by an image processing device on the image data; and controlling the encoding processing, based on the selected information regarding the encoding.

A program recorded on a first recording medium of the present invention causes a computer to execute processing including: a comparing step of comparing the supplied information regarding the encoding with conditions regarding encoding processing to be executed on the image data, and a selecting step of selecting information usable in the encoding processing from the information regarding the encoding, based on a comparison result provided by the processing in the comparing step.

A first program of the present invention causes a computer to execute processing including: a comparing step of comparing the supplied information regarding the encoding with conditions regarding encoding processing to be executed on the image data, and a selecting step of selecting information usable in the encoding processing, from the information regarding the encoding, based on a comparison result provided by the processing in the comparing step.

In response to the information regarding the past encoding, the information regarding the past and the conditions regarding encoding to be executed on the image data are compared with each other. Based on the comparison result, information usable in the encoding is selected from the information regarding the encoding.

An information processing device of the present invention includes: decoding means for performing encoding processing for completely or incompletely decoding supplied image data; and encoding means for performing encoding processing for completely encoding or encoding the baseband image data, completely decoded by the decoding means, or the image data, generated by the incomplete decoding performed by the decoding means and encoded to a halfway level, to a halfway level. The encoding means includes: obtaining means for obtaining information regarding encoding performed in the past on the image data; and controlling means for controlling the encoding processing to be executed on the image data by the image processing device, by selecting information usable in the encoding processing from the information regarding the encoding, based on the information regarding the encoding and conditions regarding the encoding processing, the information regarding the encoding being obtained by the obtaining means.

An information processing method of the present invention includes a decoding step of completely or incompletely decoding supplied image data; and an encoding step of performing encoding processing for completely encoding or encoding the baseband image data, completely decoded in the processing in the decoding step, or the image data, generated by the incomplete decoding performed in the processing in the decoding step and encoded to a halfway level, to a halfway level. The processing in the encoding step includes: an obtaining step of obtaining information regarding encoding performed in the past on the image data; and a controlling step of controlling the encoding processing to be executed on the image data by the image processing device, by selecting information usable in the encoding processing from the information regarding the encoding, based on the information regarding the encoding and conditions regarding the encoding processing, the information regarding the encoding being obtained in the processing in the obtaining step.

A program recorded on a second recording medium of the present invention causing a computer to execute processing including a decoding step of completely or incompletely decoding supplied image data; and an encoding step of performing encoding processing for completely encoding or encoding the baseband image data, completely decoded in the processing in the decoding step, or the image data, generated by the incomplete decoding performed in the processing in the decoding step and encoded to a halfway level, to a halfway level. The processing in the encoding step includes: an obtaining step of obtaining information regarding encoding performed in the past on the image data; and a controlling step of controlling the encoding processing to be executed on the image data by the image processing device, by selecting information usable in the encoding processing from the information regarding the encoding, based on the information regarding the encoding and conditions regarding the encoding processing, the information regarding the encoding being obtained in the processing in the obtaining step.

A second program of the present invention causes a computer to execute processing including: a decoding step of completely or incompletely decoding supplied image data; and an encoding step of performing encoding processing for completely encoding or encoding the baseband image data, completely decoded in the processing in the decoding step, or the image data, generated by the incomplete decoding performed in the processing in the decoding step and encoded to a halfway level, to a halfway level. The processing in the encoding step includes: an obtaining step of obtaining information regarding encoding performed in the past on the image data; and a controlling step of controlling the encoding processing to be executed on the image data by the image processing device, by selecting information usable in the encoding processing from the information regarding the encoding, based on the information regarding the encoding and conditions regarding the encoding processing, the information regarding the encoding being obtained in the processing in the obtaining step.

Supplied image data is completely or incompletely decoded, and baseband image data or image data encoded to a halfway level is completely encoded or encoded to a halfway level. In the encoding, in response to the information regarding the past encoding, the information regarding the past and the conditions regarding encoding to be executed on the image data are compared with each other. Based on the comparison result, information usable in the encoding is selected from the information regarding the encoding.

An information recording device of the present invention includes: decoding means for completely or incompletely decoding supplied image data; encoding means for performing encoding processing for completely encoding or encoding the baseband image data, completely decoded by the decoding means, or the image data, generated by the incomplete decoding performed by the decoding means and encoded to a halfway level, to a halfway level; and record controlling means for controlling recording of the image data encoded by the encoding means. The encoding means includes: obtaining means for obtaining information regarding encoding performed in the past on the image data; and controlling means for controlling the encoding processing to be executed on the image data by the image processing device, by selecting information usable in the encoding processing from the information regarding the encoding, based on the information regarding the encoding and conditions regarding the encoding processing, the information regarding the encoding being obtained by the obtaining means.

The record controlling means can control recording of image data, encoded by the encoding means, and the information regarding the encoding, performed on the image data, onto different positions.

An information recording method of the present invention includes a decoding step of completely or incompletely decoding supplied image data; an encoding step of performing encoding processing for completely encoding or encoding the baseband image data, completely decoded in the processing in the decoding step, or the image data, generated by the incomplete decoding performed in the processing in the decoding step and encoded to a halfway level, to a halfway level; and a record controlling step of controlling recording of the image data encoded in the processing in the encoding step. The processing in the encoding step includes: an obtaining step of obtaining information regarding encoding performed in the past on the image data; and a controlling step of controlling the encoding processing to be executed on the image data by the image processing device, by selecting information usable in the encoding processing from the information regarding the encoding, based on the information regarding the encoding and conditions regarding the encoding processing, the information regarding the encoding being obtained in the processing in the obtaining step.

Supplied image data is completely or incompletely decoded, baseband image data or image data encoded to a halfway level is completely encoded or encoded to a halfway level, and the recording of the encoded image data is controlled. In the encoding, in response to the information regarding the past encoding, the information regarding the past and the conditions regarding encoding to be executed on the image data are compared with each other. Based on the comparison result, information usable in the encoding is selected from the information regarding the encoding.

An information reproducing device of the present invention includes: reproducing means for reproducing image data recorded on a predetermined storage medium; decoding means for completely or incompletely decoding the image data reproduced by the reproducing means; and encoding means for performing encoding processing for completely encoding or encoding the baseband image data, completely decoded by the decoding means, or the image data, generated by the incomplete decoding performed by the decoding means and encoded to a halfway level, to a halfway level. The encoding means includes: obtaining means for obtaining information regarding encoding performed in the past on the image data; and controlling means for controlling the encoding processing to be executed on the image data by the image processing device, by selecting information usable in the encoding processing from the information regarding the encoding, based on the information regarding the encoding and conditions regarding the encoding processing, the information regarding the encoding being obtained by the obtaining means.

An information reproducing method of the present invention includes: a reproducing step of reproducing image data recorded on a predetermined storage medium; a decoding step of completely or incompletely decoding the image data reproduced in the processing in the reproducing step; and an encoding means step of performing encoding processing for completely encoding or encoding the baseband image data, completely decoded in the processing in the decoding step, or the image data, generated by the incomplete decoding performed in the decoding step and encoded to a halfway level, to a halfway level. The processing in the encoding step includes: an obtaining step of obtaining information regarding encoding performed in the past on the image data; and a controlling step of controlling the encoding processing to be executed on the image data by the image processing device, by selecting information usable in the encoding processing from the information regarding the encoding, based on the information regarding the encoding and conditions regarding the encoding processing, the information regarding the encoding being obtained in the processing in the obtaining step.

Image data recorded on a predetermined storage medium is reproduced, the supplied image data is completely or incompletely decoded, and baseband image data or image data encoded to a halfway level is completely encoded or encoded to a halfway level. In the encoding, in response to the information regarding the past encoding, the information regarding the past and the conditions regarding encoding to be executed on the image data are compared with each other. Based on the comparison result, information usable in the encoding is selected from the information regarding the encoding.

BRIEF DESCRIPTION OF THE DRAWINGS

FIG. 7 is a table for describing the syntax of a compressed_stream_format_of_MPEG_2_recoding_set ( ) specified in SMPTE 329.

FIG. 8 is a view for describing information described in a user_data (2) in an extension_and_user_data (2).

BEST MODE FOR CARRYING OUT THE INVENTION

An embodiment of the present invention will be described below with reference to the drawings.

Figure 5:
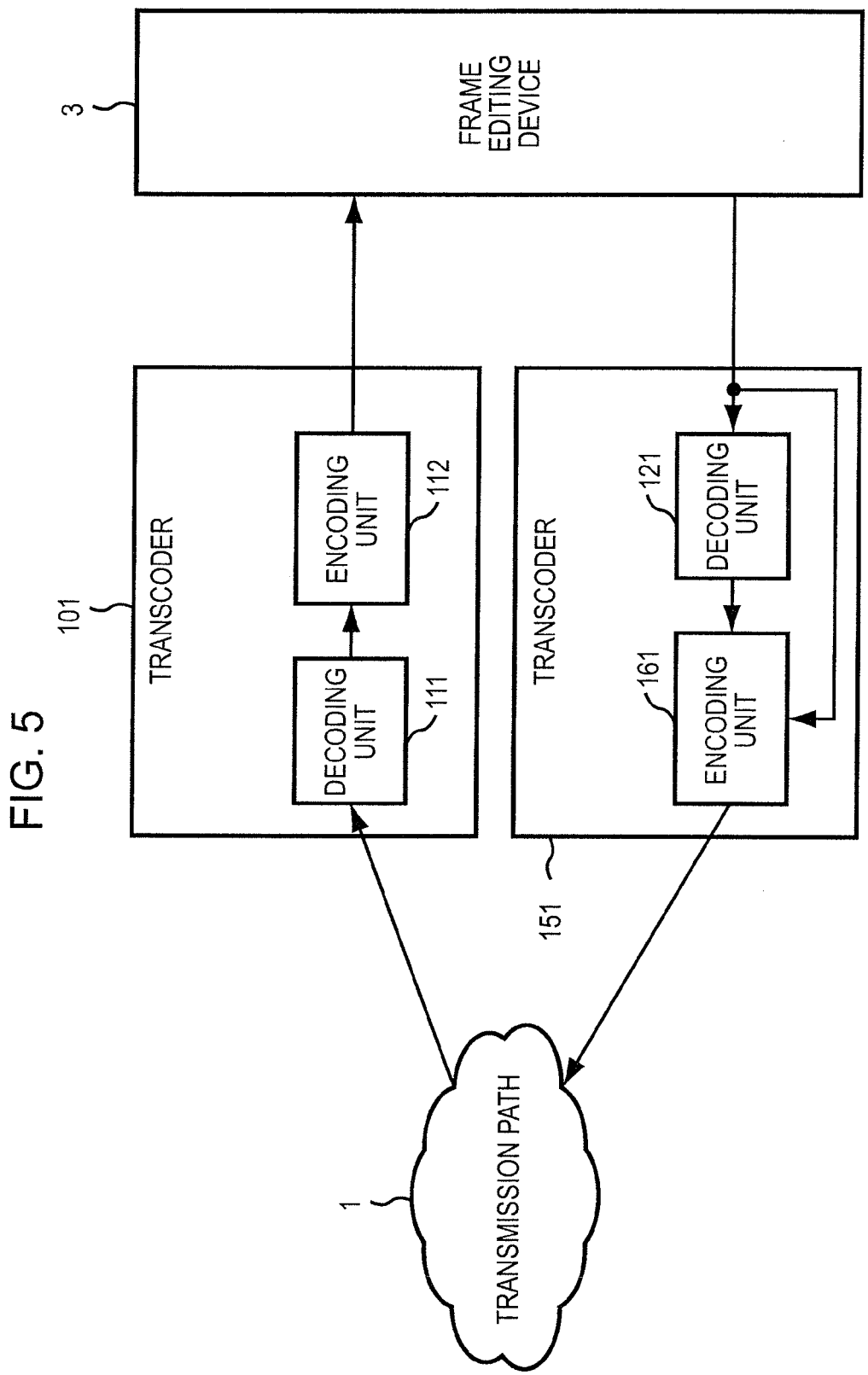
FIG. 5 is a block diagram showing the configuration of a system for performing re-encoding when frame-editing is performed.

A case in which a system, according to the present invention, that is capable of converting an MPEG long GOP into a short GOP, which allows frame editing, uses encoding history information will be described with reference to FIG. 5.

Figure 1:
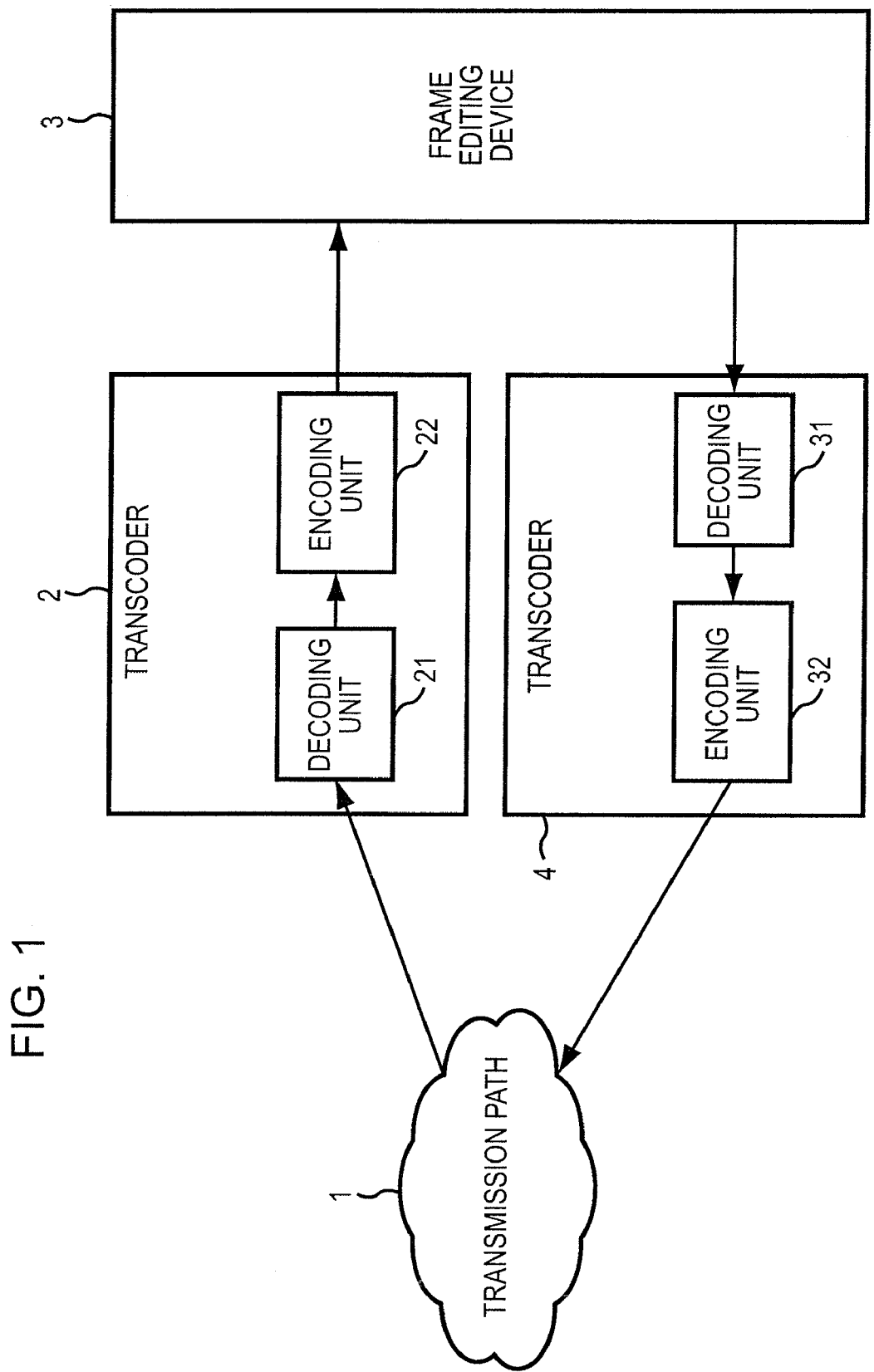
FIG. 1 is a diagram for describing a conventional system for performing re-encoding when frame-editing is performed.
Figure 2:
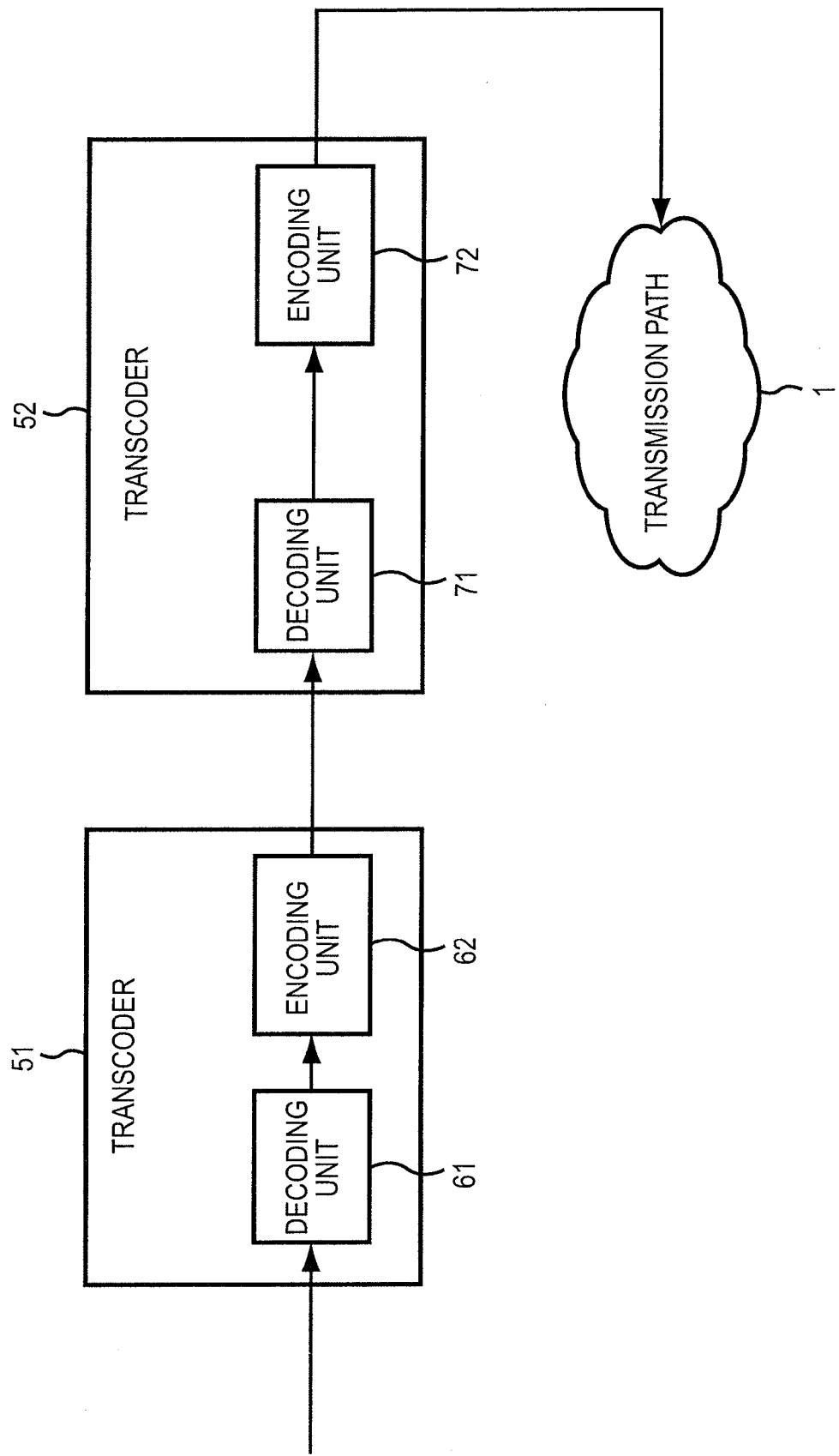
FIG. 2 is a diagram for describing a known system that can perform re-encoding by changing the bit rate of an MPEG long GOP.
Figure 3:
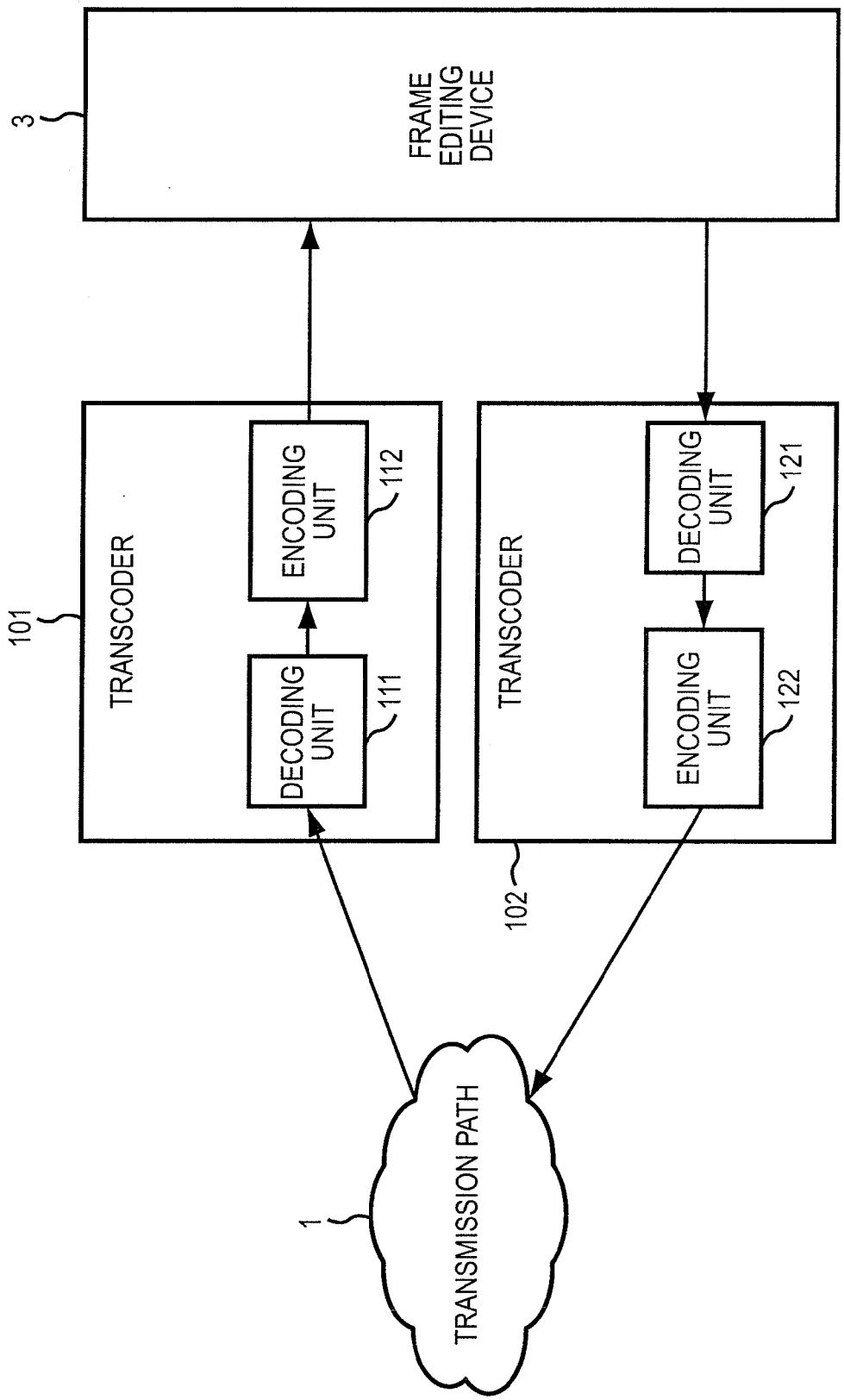
FIG. 3 is a diagram for describing a case in which encoding history information is used in a conventional system for performing re-encoding when frame-editing is performed.

Units corresponding to those in the conventional case described with reference to FIG. 3 are denoted with the same reference numerals and the descriptions thereof are omitted as appropriate. That is, the system has essentially the same configuration as the conventional case described with reference to FIG. 3, except that a transcoder 151 is provided instead of the transcoder 102. The transcoder 151 has essentially the same configuration as the transcoder 102, except that an encoding unit 161 that can select reusable history information (history information) is provided, instead of the encoding unit 122, so as to correspond to the conditions of the supplied stream. Stream data input to the encoding unit 121, other than encoded signals output from the decoding unit 121, is also input to the encoding unit 161.

A transcoder 101 receives an MPEG long GOP through a transmission path 1.

The MPEG long GOP is constituted by three types of pictures (I pictures, P pictures, and B pictures). In the transcoder 101, a decoding unit 111 temporarily decodes the stream data of the supplied MPEG long GOP, and an encoding unit 112 then encodes the stream data so that all of it becomes intra-frames. In this case, in the subsequent processing, when the stream data is re-encoded into a long GOP, parameters in encoding executed in the past, i.e., parameters in encoding by a device that transmitted the MPEG long GOP stream to the transcoder 101 through the transmission path 1, are added to the all-intra stream, as SMPTE 328M history information (history data), and the resulting stream data is supplied to a frame editing device 3, in order to prevent vide data having an I-picture, P-picture, or B-picture format from being encoded in a different picture type.

The stream data with the history information, the data being subjected to frame editing by the frame editing unit 3, is supplied to the transcoder 151. In the transcoder 151, the decoding unit 121 decodes the supplied all-intra stream data with history information. The encoding unit 161 uses picture-layer and macroblock-layer parameters contained in the decoded history information, as required, to re-encode information decoded by the decoding unit 121 into a long GOP and outputs the long GOP. Examples of the parameters include a picture type, a motion vector, and a quantization value in the past encoding.

Figure 6:
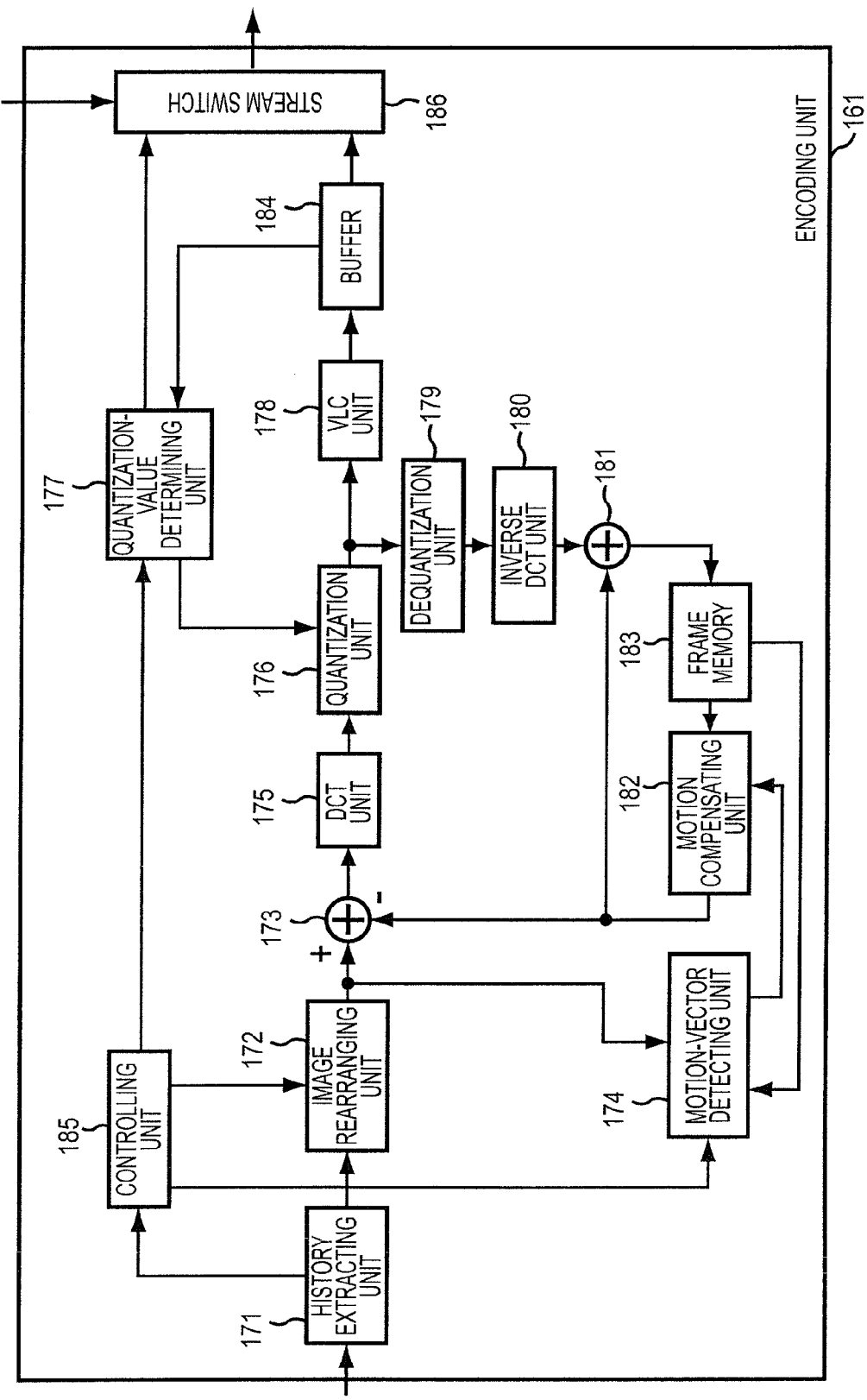
FIG. 6 is a block diagram showing the configuration of an encoding unit 5 shown in FIG. 5.

FIG. 6 is a block diagram showing the configuration of the encoding unit 161.

A history extracting unit 171 extracts history information from the all-intra stream with history information, the stream being decoded by the decoding unit 121. The history extracting unit 171 then supplies the extracted history information to a controlling unit 185 and also supplies a video stream to a video rearranging unit 172. The history information contains information on encoding executed in the past, such as a picture type, quantization value, motion vector, or quantization matrix.

Based on the past-encoding parameters extracted contained in the history information extracted by the history extracting unit 171, the controlling unit 185 controls the image rearranging unit 172, a motion-vector detecting unit 174, or a quantization-value determining unit 177, as required.

The history information extracted by the history extracting unit 171 is described in a compressed_stream_format_of_MPEG_2_recoding_set ( ) format specified in SMPTE 329M. Next, the syntax of the compressed_stream_format_of_MPEG_2_recoding_set ( ) specified in SMPTE 329M will be described with reference to FIG. 7.

The compressed_stream_format_of_MPEG_2_recoding_set ( ) specified in SMPTE 329M is constituted by data elements defined by a next_start_code ( ) function, a sequence_header ( ) function, a sequence_extension ( ) function, an extension_and_user_data (0) function, a group_of_picture_header ( ) function, an extension_and_user_data (1) function, a picture_header ( ) function, a picture_coding_extension ( ) function, an extension_and_user_data (2) function, and a picture_data ( ) function.

The next_start_code ( ) function is a function for searching for a start code present in a bit stream. Examples of a data element defined by the sequence_header ( ) function include a horizontal_size_value, which is data composed of low-order 12 bits of the number of pixels in the horizontal direction of an image, a vertical_size_value, which is data composed of low-order 12 bits of the number of vertical lines of the image, and a VBV_buffer_size_value, which is low-order 10-bit data of a value that determines the size of a virtual buffer (VBV: video buffer verifier) for controlling the amount of generation code. Examples of a data element defined by the sequence_extension ( ) function include a progressive_sequence, which is data indicating the forward scanning of the video data, a chroma_format, which is data specifying a color-difference format of the video data, and a low_delay, which is data indicating that no B picture is contained.

With an extension_and_user_data (i) function, when "i" is a value other than 2, a data element defined by an extension_data ( ) function is not described but only a data element defined by a user_data ( ) function is described as a history stream. Thus, with the extension_and_user_data (0) function, only a data element defined by the user_data ( ) function is described as a history stream. Only when a group_start_code indicating a GOP-layer start code is described in the history stream, a data element defined by the group_of_picture_header ( ) function and a data element defined by the extension_and_user_data (1) function are described.

Examples of a data element defined by the picture_header ( ) function include a picture_start_code, which is data expressing a start synchronization code for a picture layer, and a temporal_reference, which is a number indicating the display sequence of pictures and is data reset at the front end of a GOP. Examples of a data element defined by the picture_coding_extension ( ) function include a picture_structure, which is data indicating a frame structure or a field structure and is data indicating a high-order field or a low-order field in the case of the field structure, a top_field_first, which is data indicating whether the first field is a high-order or low-order field in the case of the frame structure, a q_scale_type, which is data indicating whether to use a linear quantization scale or nonlinear quantization scale, and a repeat_firt_field, which is data used for 2:3 pull down.

A data element defined by the re_coding_stream_info ( ) is defined by SMPTE 327M. The extension_and_user_data (2) will be described with reference to FIG. 8. A data element defined by the picture_data ( ) function is a data element defined by a slice ( ) function. The slice ( ) function defines a macroblock ( ) and the macroblock ( ) describes motion_vectors information.

Information described in a user_data (2) in the extension_and_user_data (2) of the cmpressed_stream_format_of_MPEG_2_recoding_set ( ) illustrated in FIG. 7 will be described with reference to FIG. 8.

A Stream_Information_Header is a 32-bit data in which a header number for identification for a user_data in a picture_layer is described, and is constituted by a 16-bit Stream_Information_Header in which a value that allows this information to be identified as a user_data, an 8-bit Length indicating the byte length of a Streama_Information ( ), and a marker_bits.

An Encoder_Serial_Number is a number (serial number) uniquely assigned to an encoder (an encoding unit or an encoding device) and is 16-bit information. An Encoder_ID is an ID indicating the type of encoder and is 15-bit information.

A subsequent Encoding_State_Time_Code is information indicating time at which the generation of this stream is started and is 8-byte information in which the msb of byte data is marker_bit=1. In this case, 6 bytes out of the 8 bytes are used, and year (Time_Year), month (Time_Month), day (Time_Day), time (Time_Hour), minute (Time_Minute), and second (Time_Second) at which the generation of the stream is started are described. These values are constant in one stream.

A Generation_Counter (GenC) is a counter value indicating the number of encoding generations and is 4-bit information. The counting of the number of encoding generations is started (is designated as a first generation) when SDI (Serial Digital Interface) data is encoded into ASI (Asynchronous Serial Interface) data, and the counter value is incremented when the ASI data is re-encoded into ASI data or when SDTI CP (Serial Data Transport Interface-Contents Package) data is re-encoded into ASI data.

The SDTI CP is a global standard specification, promoted by a Pro-MPEG forum and standardized as SMPTE 326M, for transmitting (synchronously transferring) MPEG data in real time and is a transmission scheme for a case of all intra-frames (all intras). The SDI is an uncompressed digital video/audio transmission scheme contemplated based on point-to-point transmission and is specified in ANSI/SMPTE 259M. ASI is a scheme for transmitting the stream data of an encoded MPEG long GOP.

A Continuity_Counter is a counter incremented for each frame, and when exceeding the maximum value thereof, the counting is started from 0 again. Rather than the number of frames, the umber of fields or the number of pictures may be counted as required.

Since information described below is information extracted from parameters generated when decoded by the decoder (the decoding unit or decoding device) for insertion, only an area is allotted in a state before the insertion.

A picture_coding_type is 3-bit information indicating a picture coding type compliant with the MPEG 2 standard and indicates, for example, whether the picture is an I picture, B picture, or P picture. A temporal_reference is 10-bit information compliant with the MPEG 2 standard and indicates the sequence of images in a GOP (the sequence is counted for each picture).

A reuse_level is 7-bit information for specifying the reuse of parameters. An error_flag is a flag for issuing a notification indicating various types of error.

A header_present_flag (A) is 2-bit flag information for a sequence header present flag and a GOP header present flag.

An extension_start_code_flags is 16-bit flag information that is not specified in the SMPTE and indicates whether or not various extension IDs are contained. "0" indicates that any extension ID is not contained and "1" indicates that an extension ID is contained. Examples of the extension ID include a sequence extension ID, sequence display extension ID, quant matrix extension ID, copyright extension ID, sequence scalable extension ID, picture display extension ID, picture coding extension ID, picture spatial scalable extension ID, and picture temporal scalable extension ID.

An other_start_codes ("other" in the figure) is 5-bit flag information indicating in which layer the start code of user data is contained or indicating whether or not a sequence error code and sequence end code are contained.

What is denoted as "B" in the figure is 1-bit information for a reduced_bandwidth_flag (B) and what is denoted "C" is 2-bit information for a reduced_bandwidth_indicator (C). A num_of_picture_bytes is 22-bit information indicating the amount of picture generation and is used for rate controlling and so on.

A bit_rate_extension is a 12-bit extension-information field regarding a bit rate and a bit_rate_value is 18-bit information. In the formats specified in the SMPTE, bit-rate information is subjected to statistical multiplexing and is often described in a specific value (e.g., "ff"). Thus, the information cannot be used for re-encoding. In contrast, since the bit_rate_extension is a field in which an actual bit-rate value in the previous encoding is described for use in re-encoding.

The controlling unit 185 receives the history information, described with reference to FIGS. 7 and 8, from the history extracting unit 171. Based on whether or not the content described in the history information conforms to predetermined conditions, the controlling unit 185 controls part or all processing of the image rearranging unit 172, the motion-vector detecting unit 174, the quantization-value determining unit 177, and a stream switch 186.

Specifically, the controlling unit 185 determines whether or not a delay mode, picture structure, and pulldown mode in the previous encoding conform to those in the current encoding. Upon determining that they do not conform to each other, the controlling unit 185 determines that the regular encoding described below is to be executed without reusing the parameters. The delay mode is information described in the low_delay in the sequence_extension ( ) function in SMPTE 329M, the picture structure and the pulldown mode are information described in the picture_structure, the top_field_first, and the repeat_firt_field in the picture_coding_extension ( ) function in SMPTE 329M.

Upon determining that the delay mode, picture structure, and pulldown mode in the previous encoding conform to those in the current encoding, the controlling unit 185 determines whether or not an image frame to be encoded next matches an encoded image frame indicated by the history information. Upon determining that the image frames do not match each other, the controlling unit 185 reuses only the information of the picture type (the picture_coding_type described in the user_data (2) in the extension_and_user_data (2), the picture_coding_type being described with reference to FIG. 8). Whether or not the image frames match each other is determined by comparing the horizontal_size_value and the vertical_size_value described in the sequence_header ( ) function in SMPTE 329M and comparing a v_phase and an h_phase in SMPTE 329.

When it is determined that the picture type in the previous encoding is to be reused, the image rearranging unit 172 rearranges images based on the picture type contained in the history information, in accordance with a control signal supplied from the controlling unit 185.

Upon determining that the image frames match each other, the controlling unit 185 determines whether or not the bit rate in the previous encoding is smaller than the bit rate in the current encoding and the chroma format in the previous encoding is larger than or equal to the current chroma format. When any of the conditions is not satisfied, the controlling unit 185 reuses the motion-vector information (the motion_vectors information described in a slice ( ) function in the picture_data ( ) function), in addition to the picture-type information. The bit-rate information is described in the bit_rate_value in the user_data (2) in the extension_and_user_data (2) in SMPTE 329M. The chroma-format information is described in the chroma_format in the sequence_header ( ) function in SMPTE 329M.

In accordance with a control signal supplied from the controlling unit 185, the motion-vector detecting unit 174 reuses, as a motion vector, motion-vector information in the past encoding.

Upon determining that the bit rate in the previous encoding is smaller than the bit rate in the current encoding and the chroma format in the previous encoding is larger than or equal to the current chroma format, the controlling unit 185 reuses a quantization value (q_scale) in addition to the picture type and the motion vector.

As required, in accordance with a control signal supplied from the controlling unit 185, the quantization-value determining unit 177 supplies the reused quantization value to a quantization unit 176 to cause the execution of quantization.

The description is returned to FIG. 6.

As required, in accordance with control by the controlling unit 185, the video rearranging unit 172 rearranges the frame images of image data that are sequentially input; generates macroblock data, divided into macroblocks constituted by a 16-pixel×16-line brightness signal and a color-difference signal corresponding to the brightness signal; and supplies the macroblock data to an arithmetic unit 173 and the motion-vector detecting unit 174.

Upon receiving the macroblock data, in accordance with control by the controlling unit 185, the motion-vector detecting unit 174 determines the motion vector of each macroblock, based on the macroblock data and reference image data stored in a frame memory 183. The motion-vector detecting unit 174 supplies the determined motion vector to a motion compensating unit 182 as motion-vector data, or reuses a past-encoding motion vector supplied from the controlling unit 185 and sends the motion vector to the motion compensating unit 182.

The arithmetic unit 173 performs motion compensation, based on the image type of each macroblock, with respect to the macroblock data supplied from the video rearranging unit 172. Specifically, the arithmetic unit 173 performs motion compensation in an intra mode, with respect an I picture; performs motion compensation in a forward prediction mode, with respect to a P picture; and performs motion compensation in a bidirectional prediction mode, with respect to a B picture.

The intra mode as used herein refers to a method in which a frame image to be encoded is used as transmission data without change. The forward prediction mode is a method in which a prediction residual between a frame image to be encoded and a past reference image is used as transmission data. The bidirectional prediction mode is a method in which a frame image to be encoded and a prediction residual between past and future reference images are used as transmission data.

When the macroblock data contains I pictures, the macroblock data is processed in the intra mode. That is, the arithmetic unit 173 sends the macroblocks of the input macroblock data to a DCT (discrete cosine transform) unit 175 as arithmetic data without change. The DCT unit 175 performs DCT transform processing on the input arithmetic data to provide a DCT coefficient and sends it to the quantization unit 176 as DCT coefficient data.

In accordance with a quantization value Q supplied from the quantization-value determining unit 177, the quantization unit 176 performs quantization processing on the input DCT coefficient data and sends, as quantization DCT coefficient data, the resulting data to a VLC (variable length code) unit 178 and a dequantization unit 179. In accordance with the quantization value Q supplied from the quantization-value determining unit 177, the quantization unit 176 is adapted to control the amount of code to be generated, by adjusting a quantization step size in the quantization processing.

The quantization DCT coefficient data sent to the dequantization unit 179 is subjected to dequantization processing in the same quantization step size as that for the quantization unit 176 and is sent to an inverse DCT unit 180 as DCT coefficient data. The inverse DCT unit 180 performs inverse-DCT processing on the supplied DCT coefficient data, and the generated arithmetic data is sent to an arithmetic unit 181 and is stored in the frame memory 183 as reference image data.

When the macroblock data includes P pictures, the arithmetic unit 173 performs motion-compensation processing in the forward prediction mode, with respect to the macroblock data. When the macroblock data includes B pictures, the arithmetic unit 173 performs motion-compensation processing in the bidirectional prediction mode, with respect to the macroblock data.

In accordance with the motion-vector data, the motion compensating unit 182 performs motion compensation on the reference image data stored in the frame memory 183 to provide forward-prediction image data or bidirectional-prediction image data. With respect to the macroblock data, the arithmetic unit 173 executes subtraction processing using the forward-prediction image data or the bidirectional-prediction image data supplied from the motion compensating unit 182.

That is, in the forward prediction mode, the motion compensating unit 182 shifts a read address in the frame memory 183 in accordance with the motion-vector data to read the reference image data and supplies the reference image data to the arithmetic unit 173 and the arithmetic unit 181 as forward-prediction image data. The arithmetic unit 173 subtracts the forward-prediction image data from the supplied macroblock data to obtain difference data as the prediction residual. The arithmetic unit 173 then sends the difference data to the DCT unit 175.

The forward-prediction image data is supplied from the motion compensating unit 182 to the arithmetic unit 181, and the arithmetic unit 181 adds the forward-prediction image data to the arithmetic data supplied from the inverse DCT unit, locally reproduces the reference image data, and outputs the reproduced data to the frame memory 183 for storage.

In the bidirectional prediction mode, the motion compensating unit 182 shifts a read address in the frame memory 183 in accordance with the motion-vector data to read the reference image data and supplies the reference image data to the arithmetic unit 173 and the arithmetic unit 181 as bidirectional-prediction image data. The arithmetic unit 173 subtracts the bidirectional-prediction image data from the supplied macroblock data to obtain difference data as the prediction residual. The arithmetic unit 173 then sends the difference data to the DCT unit 175.

The bidirectional-prediction image data is supplied from the motion compensating unit 182 to the arithmetic unit 181, and the arithmetic unit 181 adds the bidirectional-prediction image data to the arithmetic data supplied from the inverse DCT unit, locally reproduces the reference image data, and outputs the reproduced data to the frame memory 183 for storage.

Thus, the image data input to the encoding unit 161 is subjected to the motion compensation prediction processing, the DCT processing, and the quantization processing, and is supplied to the VLC unit 178 as quantized DCT coefficient data. With respect to the quantization DCT coefficient data, the VLC unit 178 performs variable-length coding processing based on a predetermined conversion table and sends the resulting variable-length-coding data to a buffer 184. The buffer 184 buffers the supplied variable-length-coding data and then outputs the buffered variable-length-coding data to the stream switch 186.

In accordance with control by the controlling unit 185, the stream switch 186 outputs the variable-length-coding data supplied from the buffer 184.

The quantization-value determining unit 177 constantly monitors the accumulation state of the variable-length-coding data stored in the buffer 184. In accordance with control by the controlling unit 185, the quantization-value determining unit 177 is adapted to determine a quantization step size, based on occupation-amount information indicating the storage state or the quantization value Q contained in the past-encoding parameters supplied from the controlling unit 185.

As described above, when the quantization value Q contained in the past-encoding parameters is supplied from the controlling unit 185 to the quantization-value determining unit 177 and the quantization value in the past encoding can be reused, the quantization-value determining unit 177 can determine the quantization step size, based on the quantization value Q contained in the past-encoding parameters.

In a case in which the quantization-value determining unit 177 does not determine the quantization step size based on the history information, when the amount of generation code for macroblocks actually generated is greater than an intended amount of generation code, the quantization-value determining unit 177 increases the quantization step size to reduce the amount of generation code. When the actual amount of generation code is smaller than the intended amount of generation code, the quantization-value determining unit 177 reduces the quantization step size to increase the amount of generation code.

That is, by estimating the progress of the accumulation state of the variable-length-coding data stored in the VBV buffer provided at the decoder side, the quantization-value determining unit 177 obtains the buffer occupation amount of virtual buffer to determine the quantization value Q and supplies the quantization value Q to the quantization unit 176.

The buffer occupation amount d(j) of virtual buffer for the ith macroblock is expressed by Equation (1) below and the buffer occupation amount d(j+1) of virtual buffer for the (j+1)th macroblock is expressed by Equation (2) below. By subtracting Equation (2) from Equation (1), the buffer occupation amount d (j+1) of virtual buffer for the (j+1)th macroblock is expressed by Equation (3) below.

$$d(j)=d(0)+B(j-1)-\{T\times(j-1)/MBcnt\} \quad (1)$$

where d (0) indicates an initial buffer capacity, B (j) indicates the number of bits of generation code for the ith macroblock, MBcnt indicates the number of macroblocks in a picture, and T indicates an intended amount of generation code for each picture.

$$d(j+1)=d(0)+B(i)-(T\times j)/MBcnt \quad (2)$$

$$d(j+1)=d(j)+\{B(j)-B(j-1)\}-T/MBcnt \quad (3)$$

When macroblocks in a picture is divided into an intra slice portion and an inter slice portion, the quantization-value determining unit 177 individually sets an intended amount of generation code Tpi and an intended amount of generation code Tpp which are allotted to the macroblocks of the intra slice portion and the macroblocks of the inter slice portion, respectively.

Thus, a generation-code-amount controlling unit 92 substitutes a buffer occupation amount d(j+1) and a constant r expressed by Equation (4) into Equation (5) to thereby determine quantization index data Q(j+1) for the macroblock (j+1) and supplies the quantization index data Q(j+1) to the quantization unit 75.

$$r=(2\times br)/pr \quad (4)$$

$$Q(j+1)=d(j+1)\times(31/r) \quad (5)$$

where br indicates a bit rate and pr indicates a picture rate.

Based on the quantization value Q, the quantization unit 176 determines the quantization step size for the next macroblock and quantizes DCT coefficient data in accordance with the quantization step size.

As a result, the quantization unit 176 can quantize DCT coefficient data in accordance with a quantization step size determined based on the amount of actual generation code for the picture immediately before and optimized for an intended amount of generation code for the next picture.

Thus, in accordance with the data occupation amount of the buffer 184, the quantization unit 176 can perform quantization so that the buffer 184 does not overflow or underflow and also can generate quantization DCT coefficient data quantized so that the VBV buffer of the decoder side does not overflow or underflow.

In the above, the description has been given of a case in which the encoding processing is performed for each picture. However, when the encoding processing is performed for each slice or for each macroblock, rather than for each picture, the encoding processing is executed in essentially the same manner.

Figure 4:
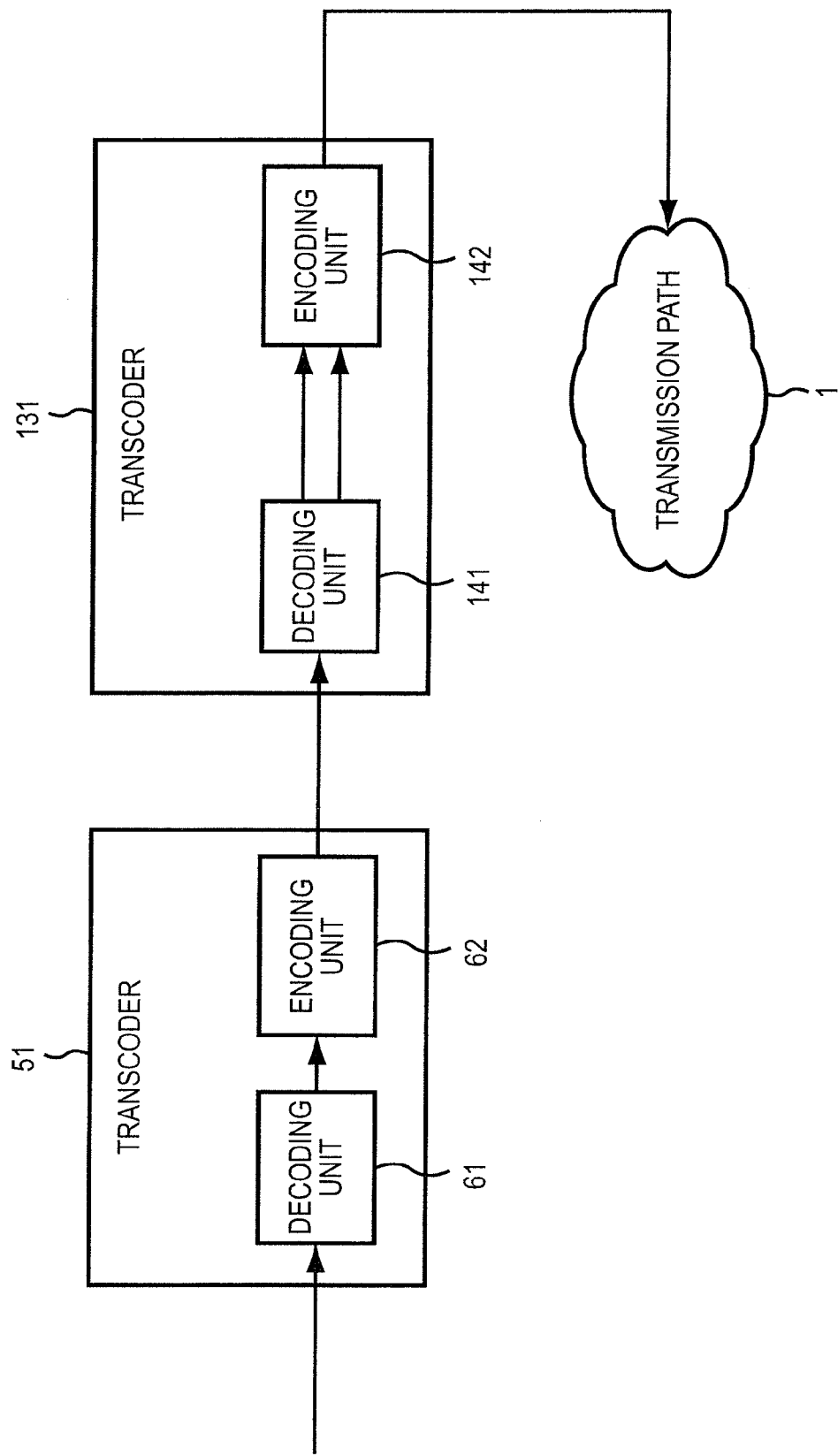
FIG. 4 is a diagram for describing a case in which encoding history information is used in a conventional system that can perform re-encoding by changing the bit rate of an MPEG long GOP.
Figure 9:
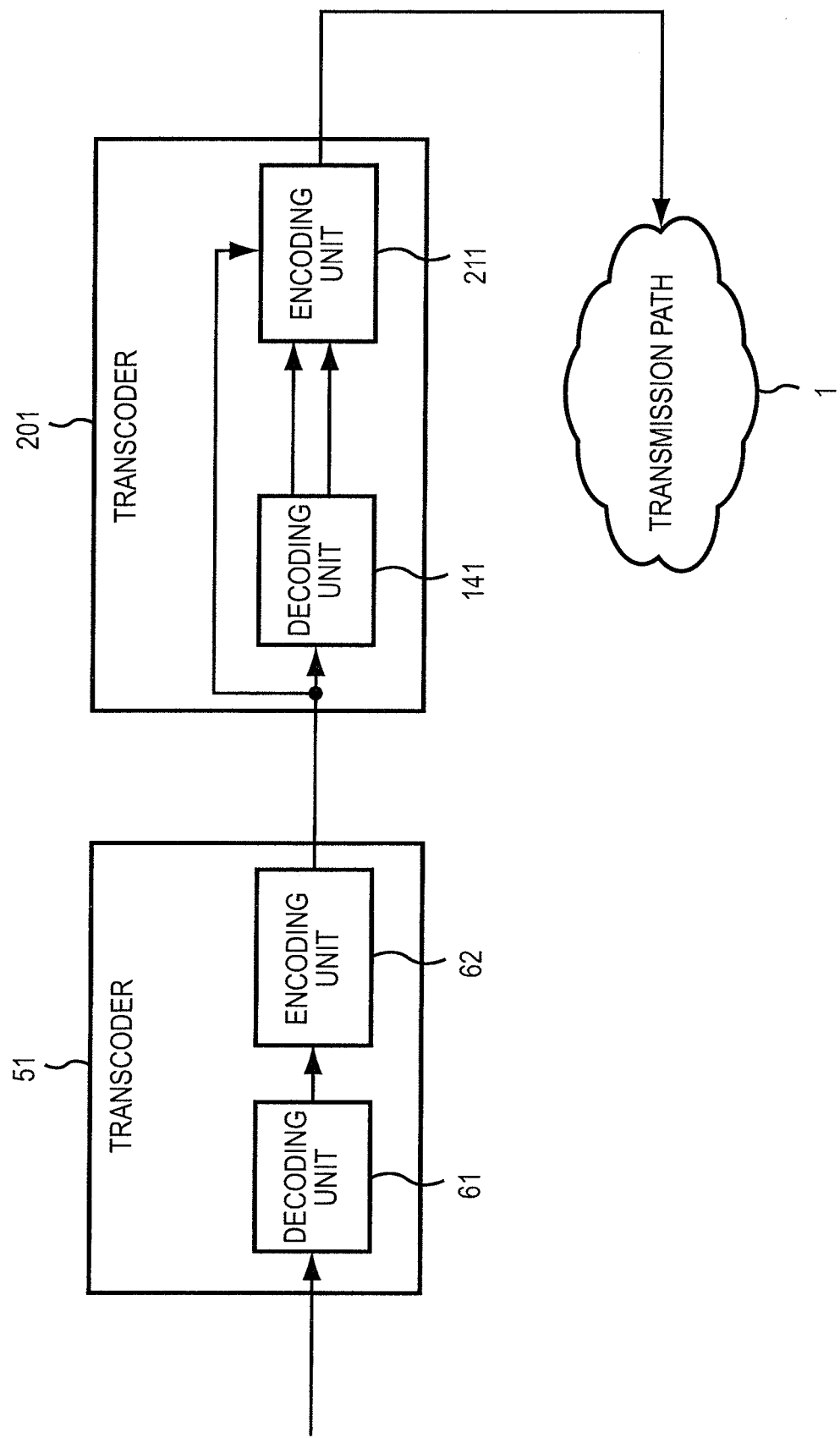
FIG. 9 is a block diagram showing the configuration of a system that can perform re-encoding by changing the bit rate of an MPEG long GOP.

The present invention can also be similarly applied to a system that is adapted to prevent image deterioration for re-encoding in a case, described with reference to FIG. 4, in which an input image is encoded into an MPEG long GOP at a high bit rate and the GOP is re-encoded, by decoding it, into a low-bit-rate long GOP. FIG. 9 is a block diagram showing the configuration of a system according to the present invention, the system being adapted to prevent image deterioration for re-encoding while preventing a VBV-buffer failure, when an input image is encoded into an MPEG long GOP at a high bit rate and the long GOP is re-encoded, by decoding it, into a low-bit-rate long GOP. Units corresponding to those in the case of FIG. 4 are denoted with the same reference numerals and the descriptions thereof are omitted as appropriate.

That is, the system shown in FIG. 9 has a transcoder 201 instead of the transcoder 131. The transcoder 201 has essentially the same configuration as the transcoder 131, except that an encoding unit 211 that can select reusable history information (parameter information) is provided, instead of the encoding unit 142, so as to correspond to conditions of s supplied stream. Stream data input to the encoding unit 141, other than encoded signals output from the decoding unit 141, is also input to the encoding unit 211.

Upon receiving the stream (ASI stream) data of an MPEG long GOP encoded by the transducer 51, the transcoder 201 obtains necessary encoding parameters when the decoding unit 141 decodes a high-bit-rate MPEG long GOP, and supplies decoded video data and the obtained encoding parameters to the encoding unit 211. As required, the encoding unit 211 uses the supplied encoding parameters to encode the video data so that it becomes a low-bit-rate MPEG long GOP and outputs the stream (ASI stream) data of the encoded low-bit-rate MPEG long GOP.

Figure 10:
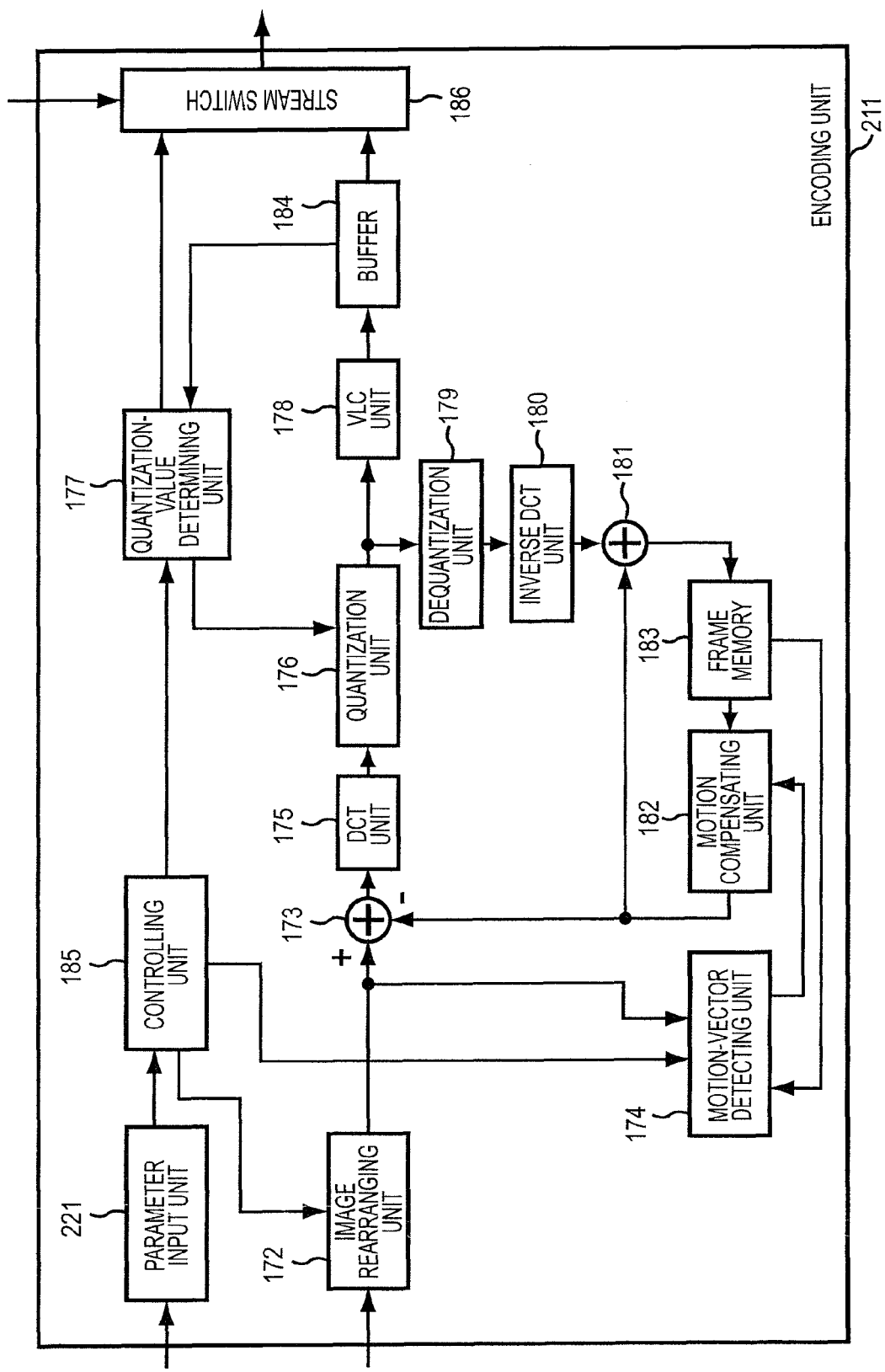
FIG. 10 is a block diagram showing the configuration of an encoding unit shown in FIG. 9.

FIG. 10 is a block diagram showing the configuration of the encoding unit 211. In FIG. 10, units corresponding to those of the encoding unit 161 in FIG. 6 are denoted with the same reference numerals and the descriptions thereof are omitted as appropriate.

The encoding unit 211 has essentially the same configuration as the encoding unit 161 shown in FIG. 6, except that the history extracting unit 171 is omitted and a parameter input unit 221 for obtaining parameters supplied from the decoding unit 141 and supplying the parameters to the controlling unit 185.

The controlling unit 185 receives parameter information containing information similar to the history information, described with reference to FIGS. 7 and 8, from the parameter input unit 221. Based on whether or not the content described in the parameter information conforms to predetermined conditions, the controlling unit 185 controls part or all processing of the image arranging unit 172, the motion-vector detecting unit 174, the quantization-value determining unit 177, and the stream switch 186.

Specifically, the controlling unit 185 determines whether or not the delay mode, picture structure, and pulldown mode in the previous encoding conform to those in the current encoding. Upon determining that they do not conform to each other, the controlling unit 185 determines that regular encoding described below is to be executed without reusing the parameters. The delay mode is information described in the parameter information, in the same manner as the low_delay in the sequence_extension ( ) function in SMPTE 329M. The picture structure and the pulldown mode are information described in the parameter information, in the same manner as the picture_structure, the top_field_first, and the repeat_firt_field in the picture_coding_extension ( ) function in SMPTE 329M.

Upon determining that the delay mode, picture structure, and pulldown mode in the previous encoding conform to those in the current encoding, the controlling unit 185 determines whether or not an image frame to be encoded next matches an encoded image frame indicated by the history information. Upon determining that the image frames do not match each other, the controlling unit 185 reuses only the picture-type information (information described in the parameter information, in the same manner as the picture_coding_type described in the user_data (2) in the extension_and_user_data (2), the picture_coding_type being described with reference to FIG. 8). Whether or not the image frames match each other is determined by performing comparison with information described in the parameter information, in the same manner as the horizontal_size_value and the vertical_size_value described in the sequence_header ( ) function in SMPTE 329M and the v_phase and the h_phase in SMPTE 329.

When it is determined that the picture type in the previous encoding is to be reused, the image rearranging unit 172 rearranges images based on the picture type contained in the parameter information, in accordance with a control signal supplied from the controlling unit 185.

Upon determining that the image frames match each other, the controlling unit 185 determines whether or not the bit rate in the previous encoding is smaller than the bit rate in the current encoding and the chroma format in the previous encoding is larger than or equal to the current chroma format. When any of the conditions is not satisfied, the controlling unit 185 reuses the motion-vector information (information described in the parameter information in the same manner as the motion_vectors information described in the slice ( ) function in the picture_data ( ) function), in addition to the picture-type information. The bit-rate information is described in the parameter information, in the same manner as the bit_rate_value in the user_data (2) in the extension_and_user_data (2) in SMPTE 329M. The chroma-format information is described in the parameter information, in the same manner as the chroma_format in the sequence_header ( ) function in SMPTE 329M.

In response to the past-encoding motion vector information from the controlling unit 185, the motion-vector detecting unit 174 reuses it as a motion vector.

Upon determining that the bit rate in the previous encoding is smaller than the bit rate in the current encoding and the chroma format in the previous encoding is larger than or equal to the current chroma format, the controlling unit 185 determines whether or not the chroma format in the parameters matches the current chroma format. When determining that they do not match each other, the controlling unit 185 reuses a quantization value (q_scale) in addition to the picture type and the motion vector.

In accordance with a control signal supplied from the controlling unit 185, the quantization-value determining unit 177 supplies the quantization value used in the past encoding to the quantization unit 176 to cause the execution of quantization.

Upon determining that the chroma format and the current chroma format match each other, the controlling unit 185 controls the stream switch 186 to output the stream data input to the decoding unit 141.

In the encoding unit 211 shown in FIG. 10, since regular encoding processing, other than the processing performed by the controlling unit 185 as to whether or not to reuse the previous encoding information contained in the parameter information, is executed in the same manner as the processing performed by the encoding unit 161 described with reference to FIG. 6. Thus, detailed description of the regular encoding processing will be omitted.

That is, when the history information or the parameter information is not reused, the encoding unit 161 described with reference to FIG. 6 and the encoding unit 211 described with reference to FIG. 10 perform regular encoding. When the picture type is reused, the encoding unit 161 and the encoding unit 211 reuse the SMPTE 329M picture_coding_type contained in the history information or similar information contained in the parameter information. Further, when the motion vector is reused, the encoding unit 161 and the encoding unit 211 reuse information obtained by excluding q_acale_code from red_bw_indicator=0 contained in the history information or similar information contained in the parameter information. When the quantization value is reused, the encoding unit 161 and the encoding unit 211 reuse the red_bw_indicator=0 contained in the history information or similar information contained in the parameter information. When the stream input to the encoder is used, the stream switch 186 is controlled so that the stream data input to the decoding unit at the previous stage is output.

Next, processing executed by the encoding unit 161 shown in FIG. 6 and the encoding unit 211 shown in FIG. 10 will be described with reference to FIG. 11.

In step S1, the controlling unit 185 receives history information from the history-information extracting unit 171 or receives parameter information from the parameter input unit 221. The controlling unit 185 refers to the low_delay in the SMPTE 329M sequence_extension ( ) function and the picture_structure, top_field_first, and repeat_firt_field in the picture_coding_extension ( ) function contained in the history information or refers to information that is similar to those pieces of information and is contained in the parameter information, to determine whether or not the delay mode, picture structure, and pulldown mode in the previous encoding conform to the encoding conditions of the current encoding.

In step S1, upon determining that the delay mode, picture structure, pulldown mode in the previous encoding do not conform to the encoding conditions of the current encoding, the controlling unit 185 determines in step S2 that the parameters are not to be reused, controls the individual units of the encoding unit 161 or the encoding unit 211 to execute encoding, and finishes the processing.

Upon determining in step S1 that the delay mode, picture structure, pulldown mode in the previous encoding conform to the encoding conditions of the current encoding, in step S3, the controlling unit 185 refers to the horizontal_size_value and vertical_size_value described in the SMPTE-329M sequence header ( ) and the SMPTE-329M v_phase and h_phase or information that is similar to those pieces of information and is contained in the parameter information, to determine whether or not an image frame on which the previous encoding was performed and an image frame at the time of re-encoding match each other in both position and size.

Upon determining in step S3 the image frame on which the previous encoding was performed and the image frame at the time of re-encoding do no match in at least one of the position and size, the controlling unit 185 determines in step S4 that the information of the picture type (picture_coding_type) is to be reused for encoding, controls the image rearranging unit 172 to perform processing, such as rearranging images by reusing the supplied picture-type information, and controls other units to execute encoding, thereby finishing the processing.

Upon determining in step S3 that the image frame on which the previous encoding was performed and the image frame at the time of re-encoding match each other in both the position and size, in step S5, the controlling unit 185 refers to the bit_rate_value in the user_data (2) and the chroma_format in the sequence_header ( ) function in the SMPTE-329M extension_and_user_data (2) contained in the history information or information that is similar to those pieces of information and that is contained in the parameter information, to determine whether the bit rate in the previous encoding is smaller than the bit rate in the current encoding and the chroma format in the previous encoding is larger than or equal to the current chroma format.

Upon determining in step S5 that the bit rate in the previous encoding is larger than the bit rate in the current encoding or the chroma format in the previous encoding is smaller than the current chroma format, the controlling unit 185 determines in step S6 that the picture type and motion vector information (the motion_vectors information) are to be reused for encoding. Further, the controlling unit 185 controls the image rearranging unit 172 to perform processing, such as rearranging images by reusing the supplied picture-type information, supplies the motion vector information in the past encoding to the motion-vector detecting unit 174 for reuse, controls other units to execute encoding, and finishes the processing.

When it is determined in step S5 that the bit rate in the previous encoding is smaller than bit rate in the current encoding and the chroma format in the previous encoding is larger than or equal to the current chroma format, in step S7, the controlling unit 185 receives parameters from the decoding unit (i.e., parameter information is used to perform reuse/encoding, instead of using history information to perform reuse/encoding) and refers to information similar to the chroma_format in the SMPTE 329 sequence_header ( ) function contained in the supplied parameter information to determine whether or not the chroma format in the parameters matches the current chroma format. That is, when the transcoder 201 including the encoding unit 211 performs format conversion from, for example, a 4:2:0 format into a 4:2:2 format, it is determined that the chroma formats do not match each other.

Upon determining in step S7 that history information is supplied from the decoding unit 161 instead of parameters being supplied from the decoding unit 141 or upon determining the chroma format in the parameter information does not match the current chroma format, the controlling unit 185 determines in step S8 that the picture type, the motion vector, and the quantization-value information (q_scale) are to be reused to perform encoding. Thus, the controlling unit 185 controls the image rearranging unit 172 to perform processing, such as rearranging images by reusing the supplied picture-type information, and supplies motion-vector information in the past encoding to the motion-vector detecting unit 174 to cause the reuse of the motion-vector information. The controlling unit 185 further causes the quantum-value determining unit 177 to supply a quantization value contained in the history information or the parameter information to the quantization unit 176 so that it executes quantization, and controls other units to execute encoding, thereby finishing the processing.

In step S7, when parameters are supplied from the decoding unit 141 and the chroma format in the parameter information matches the current chroma format, in step S9, the controlling unit 185 controls the stream switch 186 to output the stream data input to the decoding unit 141, thereby finishing the processing.

Through such processing, the previous encoding and the current encoding are compared with each other, and based on a satisfied condition, reusable encoding information can be selected. Thus, even when decoding processing and encoding processing are repeated, it is possible to prevent image data from deteriorating.

Figure 11:
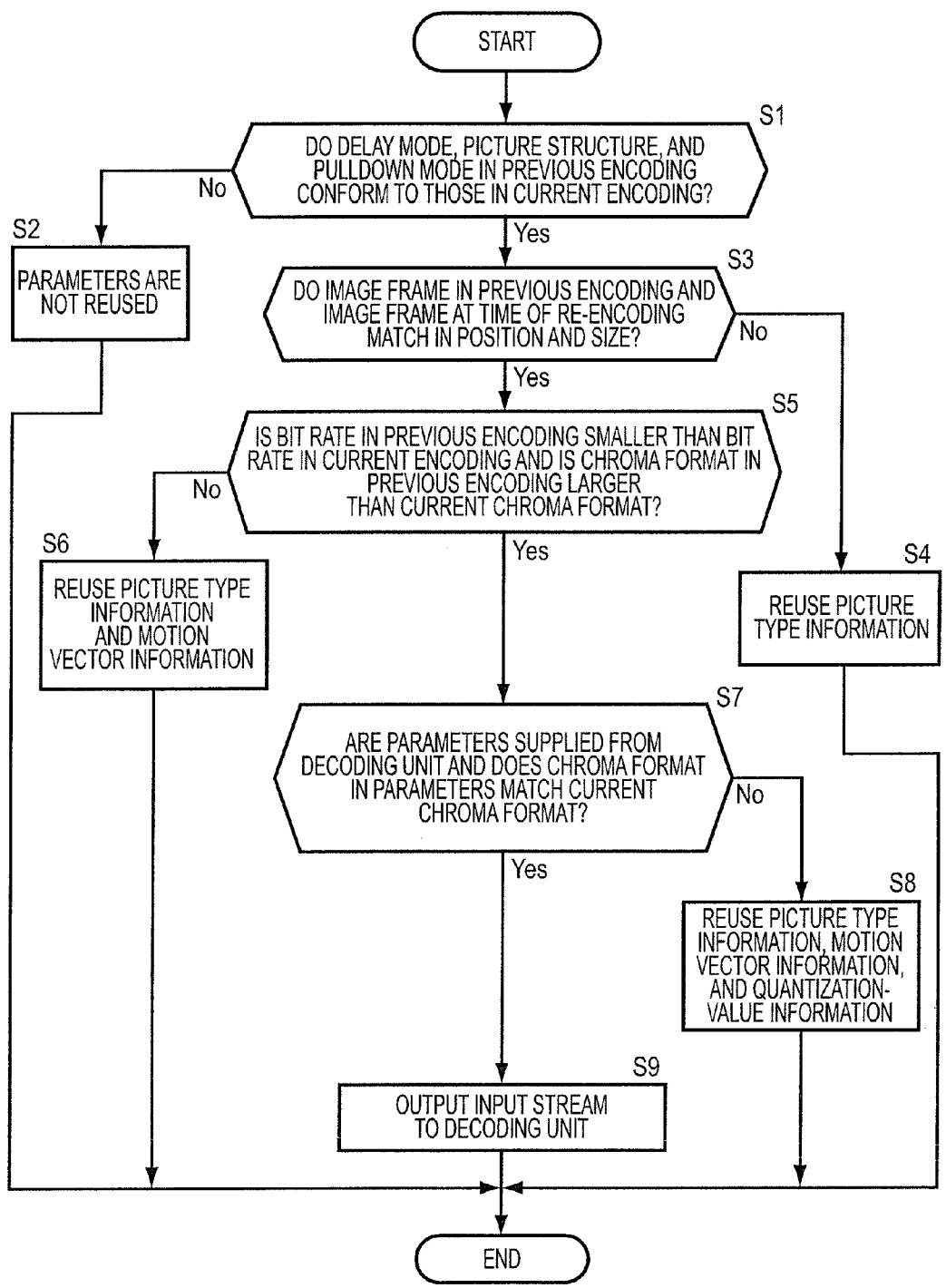
FIG. 11 is a flow chart illustrating processing executed by the encoding unit according to the present invention.

In the description in the flow chart shown in FIG. 11, in the processing in step S1, step S3, step S5, or step S7, encoding parameters in the previous encoding and conditions of current encoding are compared to determine whether or predetermined conditions are satisfied. Also, for example, when a fixed parameter exists in a data-transmission system, a determination processing for the parameter may be omitted.

The present invention is also applicable to, for example, a case in which only P pictures are used without the use of B pictures, which cause reordering delay, and I pictures, which have a large amount of generation code, and low-delay encoding in which encoding can be performed without reordering is performed by separating the P pictures into an intra-slice including multiple slices and an inter-slice including all the remaining slices.

The present invention is also applicable to cases in which all frame images are P pictures in low-delay coding and areas having various sizes are formed. Examples include a case in which an area of 2 macroblocks height and 45 macroblocks width from the top of a frame image having a frame size of 45 macroblocks width and 24 macroblocks height is set as one intra-slice portion and all the other area is set as an inter-slice portion and a case in which an area of 1 macroblock height and 45 macroblocks width is set as an intra-slice portion.

In addition, although the description in the embodiment described above has been given of a case in which the present invention is applied to the encoding unit 161 or the encoding unit 211 that performs compressing and encoding according to an MPEG scheme, the present invention is not limited thereto. Thus, the present invention may be applied to an encoding device according to various types of image compression scheme.

In the embodiment described above, although each transcoder for converting stream data has been described as having the decoding unit and the encoding unit, the present invention is also applicable to a case in which the decoding unit and the encoding unit are configured to be independent devices as a decoding device and an encoding device.

Figure 12:
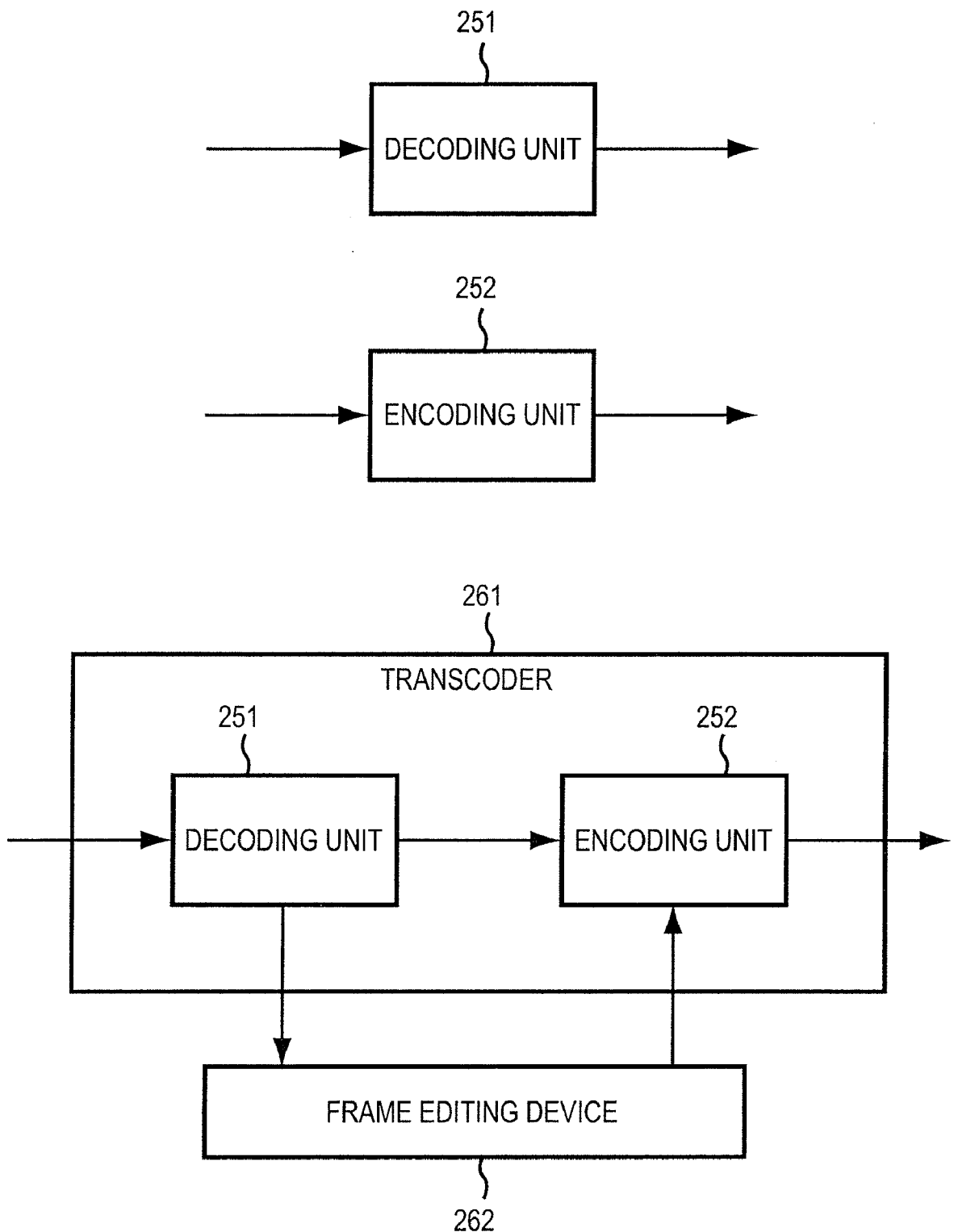
FIG. 12 is a diagram for describing the configuration of another device to which the present invention is applicable.

Thus, although each transcoder has been described as converting stream data in the embodiment described above, for example, a decoding device 251 for decoding stream data into baseband signals and an encoding device 252 for encoding baseband signals into stream data may be configured as devices independent from each other, as shown in FIG. 12. Additionally, the present invention is also applicable to a case in which the decoding device 251 does not completely decode supplied stream data and the corresponding encoding device 252 partially encodes a portion corresponding to the incompletely decoded data.

For example, when the decoding device 251 performed only decoding and dequantization on VLC code and did not execute inverse DCT, the encoding device 252 performs quantization and variable-length-coding processing but does not perform DCT conversion processing. Needless to say, the present invention is applicable to a determination as to whether or not to reuse a quantization value in the quantization performed by the encoding device 252 that performs the above-described partial encoding (i.e., encoding from a halfway level).

Additionally, the present invention is also applicable to a case in which the encoding device 252 encodes baseband signals, completely decoded by the decoding device 251, to a halfway level (e.g., DCT conversion and quantization are performed, but variable-length-coding processing is not performed) and a case in which data encoded to a halfway level (since only decoding and dequantization are performed on VLC code and inverse DCT converse is not executed) since the decoding device 251 does not completely decode the data is further encoded to a halfway level by the encoding device 252 (e.g., quantization is performed but variable-length-coding processing is not performed).

In addition, the present invention is also applicable to a transcoder 261 that includes the encoding device 251 for performing such partial decoding and the encoding unit 252 for performing partial encoding. Such a transcoder 261 is used in a case in which, for example, an editing device 262 for performing editing, such as splicing, is used.

Each transcoder to which the present invention is applied is also applicable to an information recording device for recording information on a storage medium and an information reproducing device for reproducing information recorded on a storage medium.

Figure 13:
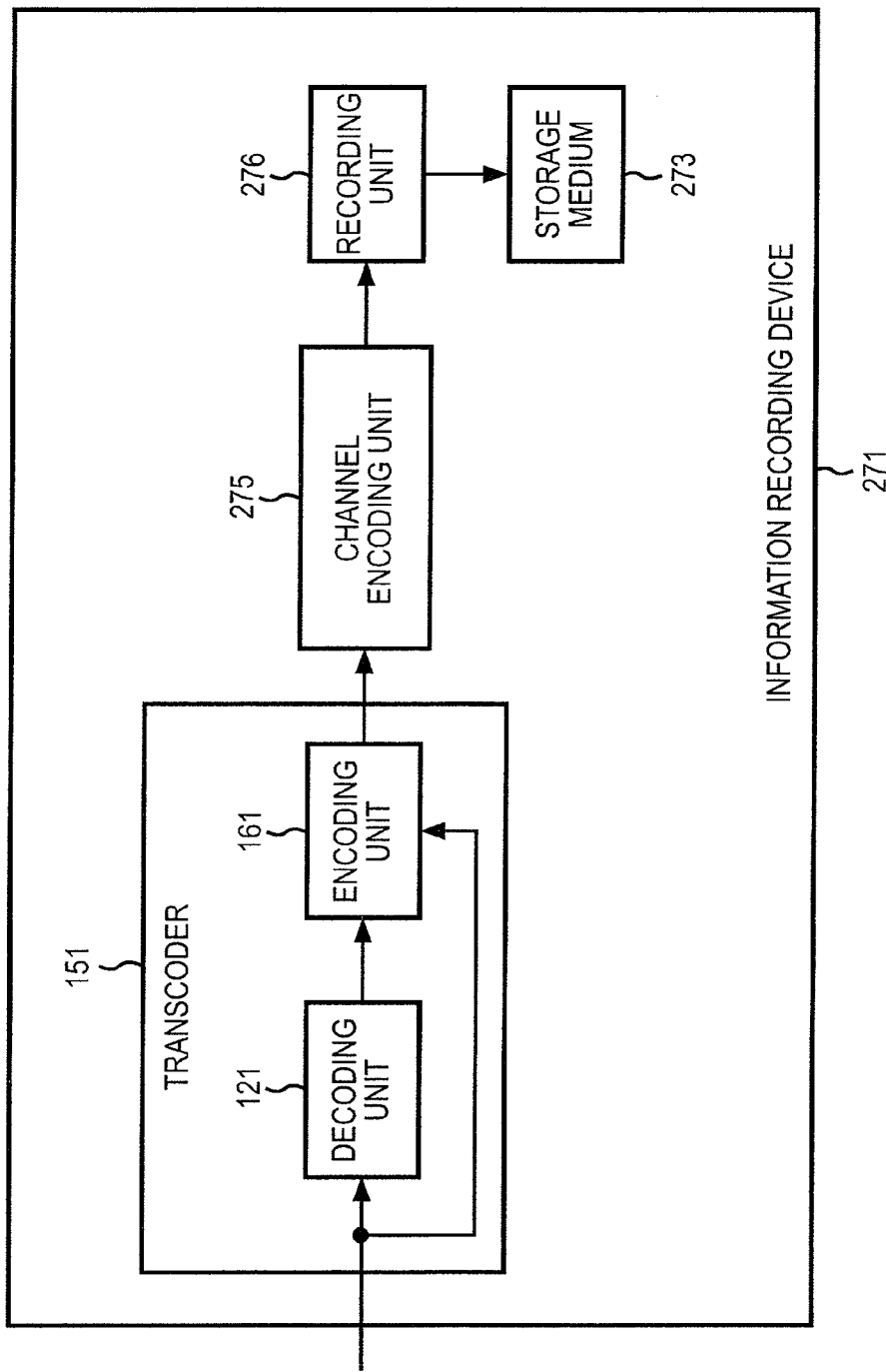
FIG. 13 is a diagram for describing the configuration of another device to which the present invention is applicable.

FIG. 13 is a block diagram showing the configuration of an information recording device 271 according to the present invention.

The information recording apparatus 271 includes the transcoder 151 described with reference to FIGS. 5 and 6, a channel encoding unit 275, and a recording unit 276 for recoding information on a storage medium 273.

In the same manner described above, information input from outside is processed by the transcoder 151 and is supplied to the channel encoding unit 275. After attaching parity code for error correction to the bit stream output from the transcoder 151, the channel encoding unit 275 performs channel-encoding processing, based on, for example, an NRZI (Non Return to Zero Inversion) modulation scheme, on the bit stream and supplies the encoded stream to the recording unit 276.

The storage medium 273 may take any form that can record information. Examples include an optical disk, such as a CD-ROM (compact disk-read only memory) or DVD (digital versatile disk); a magnet-optical disk, such as an MD (mini-disk) (trademark); a semiconductor memory; or a magnetic tape, such as a video tape.

The recording unit 276 is adapted to allow supplied information to be recorded on the storage medium 273 in a recording format corresponding to the storage medium 273. For example, when the storage medium 273 is an optical disk, the recording unit 276 is configured to include a laser for irradiating the storage medium 273 with laser light. When the storage medium 273 is a magnetic tape, the recording unit 276 is configured to include a magnetic recording head.

Figure 14:
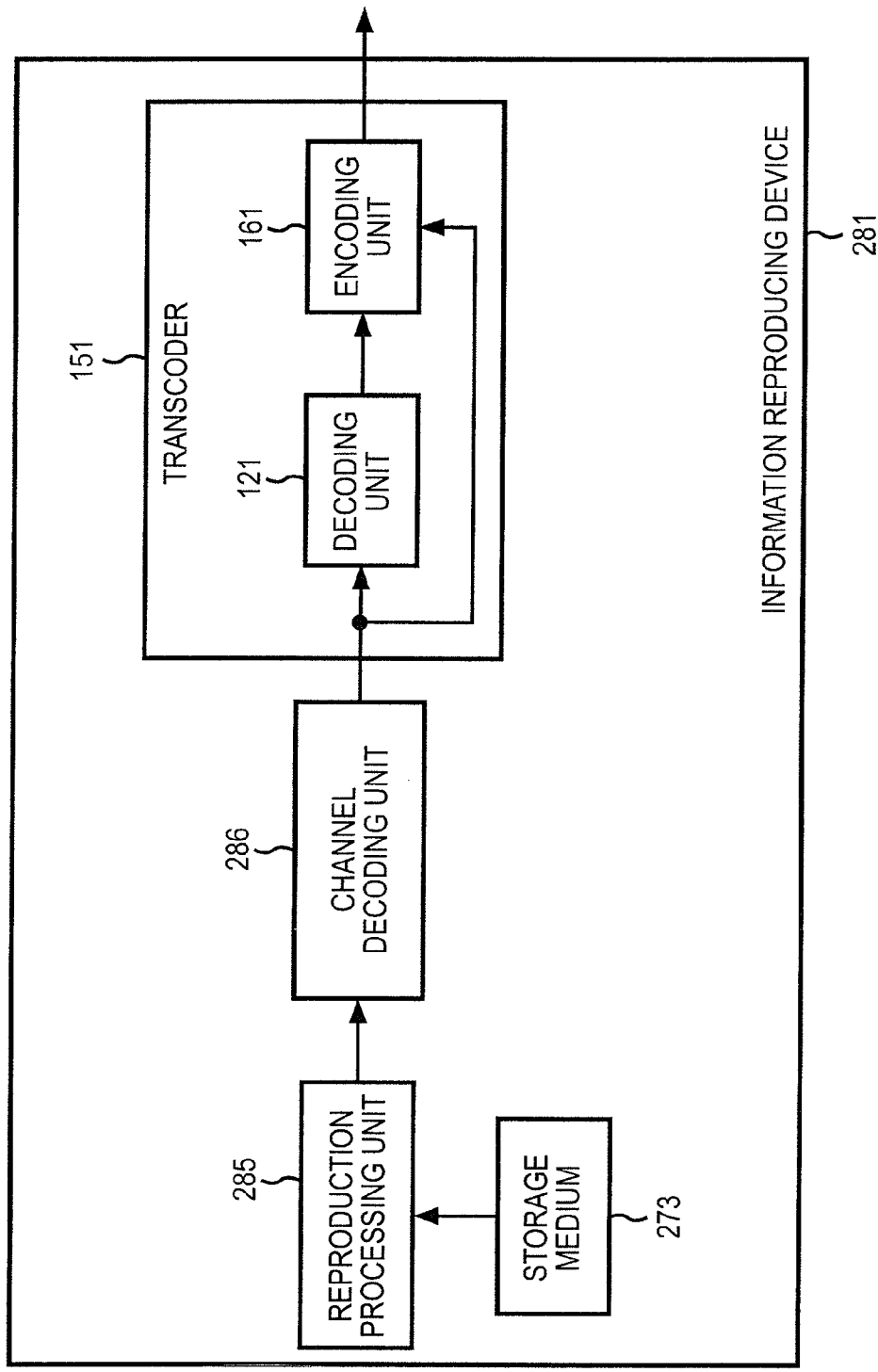
FIG. 14 is a diagram for describing the configuration of an information reproducing device to which the present invention is applicable.

FIG. 14 is a block diagram showing the configuration of an information reproducing device 281 according to the present invention.

The information reproducing device 281 includes a reproduction processing unit 285 for reproducing information from the storage medium 273, a channel decoding unit 286, and the transcoder 151 described with reference to FIGS. 5 and 6.

The reproduction processing unit 285 is adapted to allow information recorded on the storage medium 273 to be reproduced by a method corresponding to the storage medium 273 and to allow reproduced signals to be supplied to the channel decoding unit 286. For example, when the storage medium 273 is an optical disk, the reproduction processing unit 285 is configured to include an optical pickup. When the storage medium 273 is a magnetic tape, the reproduction processing unit 285 is configured to include a magnetic reproducing head.

The channel decoding unit 286 performs channel decoding on the reproduction signals, performs error-correction processing using parities, and then supplies the reproduction information after the error correction to the transcoder 151. In the same manner described above, the information supplied to the transcoder 151 is processed by the transcoder 151 and is output.

Figure 15:
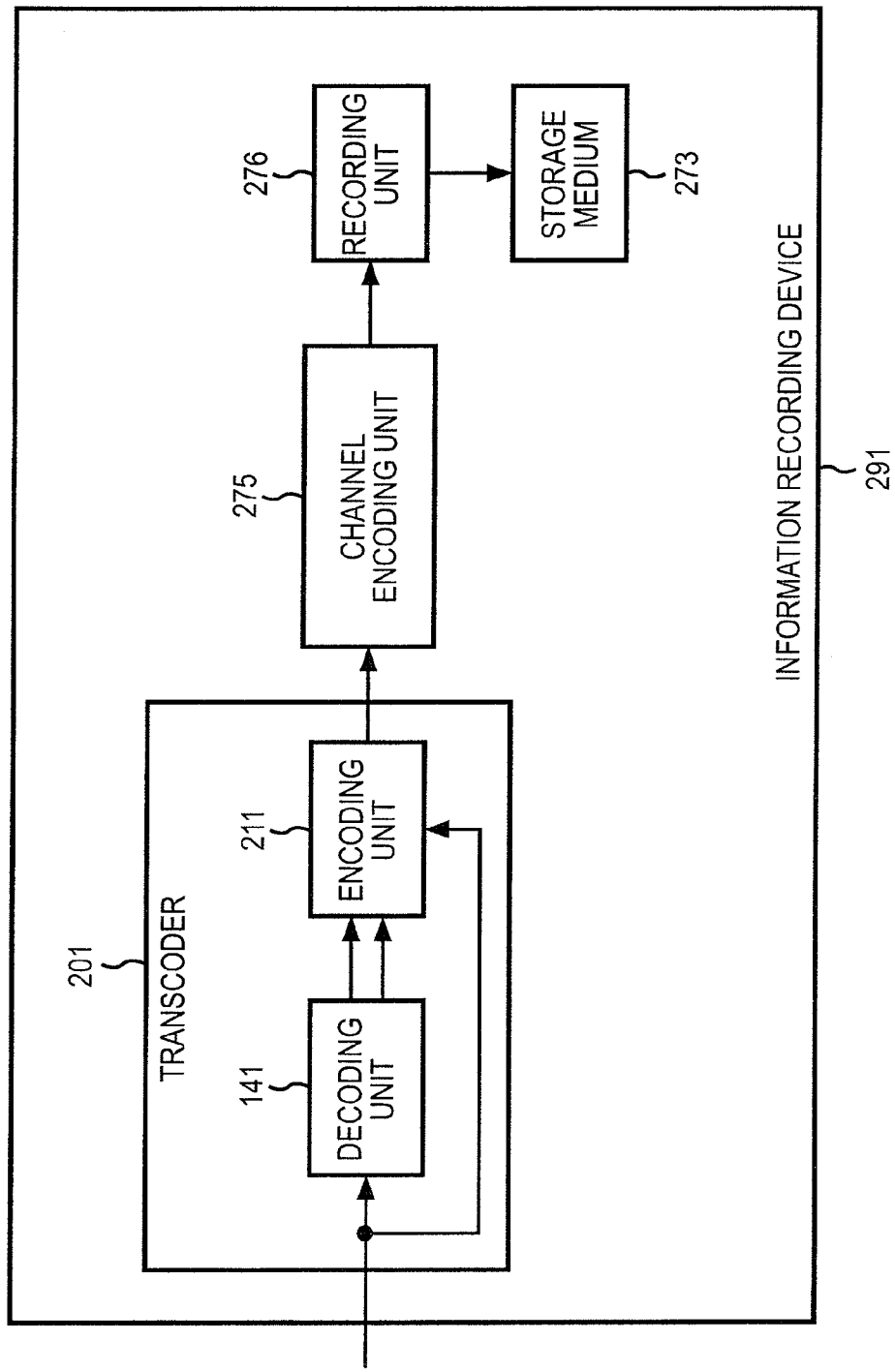
FIG. 15 is a diagram for describing the configuration of an information recording device to which the present invention is applicable.

FIG. 15 is a block diagram showing the configuration of an information recording device 291 according to the present invention.

The information recording apparatus 291 includes the transcoder 201 described with reference to FIGS. 9 and 10, a channel encoding unit 275, and a recording unit 276 for recoding information to the storage medium 273.

In the same manner described above, information input from outside is processed by the transcoder 201 and is supplied to the channel encoding unit 275. After attaching parity code for error correction to the bit stream output from the transcoder 201, the channel encoding unit 275 performs channel-encoding processing, based on, for example, an NRZI (Non Return to Zero Inversion) modulation scheme, on the bit stream and supplies the encoded stream to the recording unit 276. The recording unit 276 records the supplied information on the storage medium 273.

The information recording device 291 shown in FIG. 15 may record encoding parameters and video data at different positions on the storage medium 273.

Figure 16:
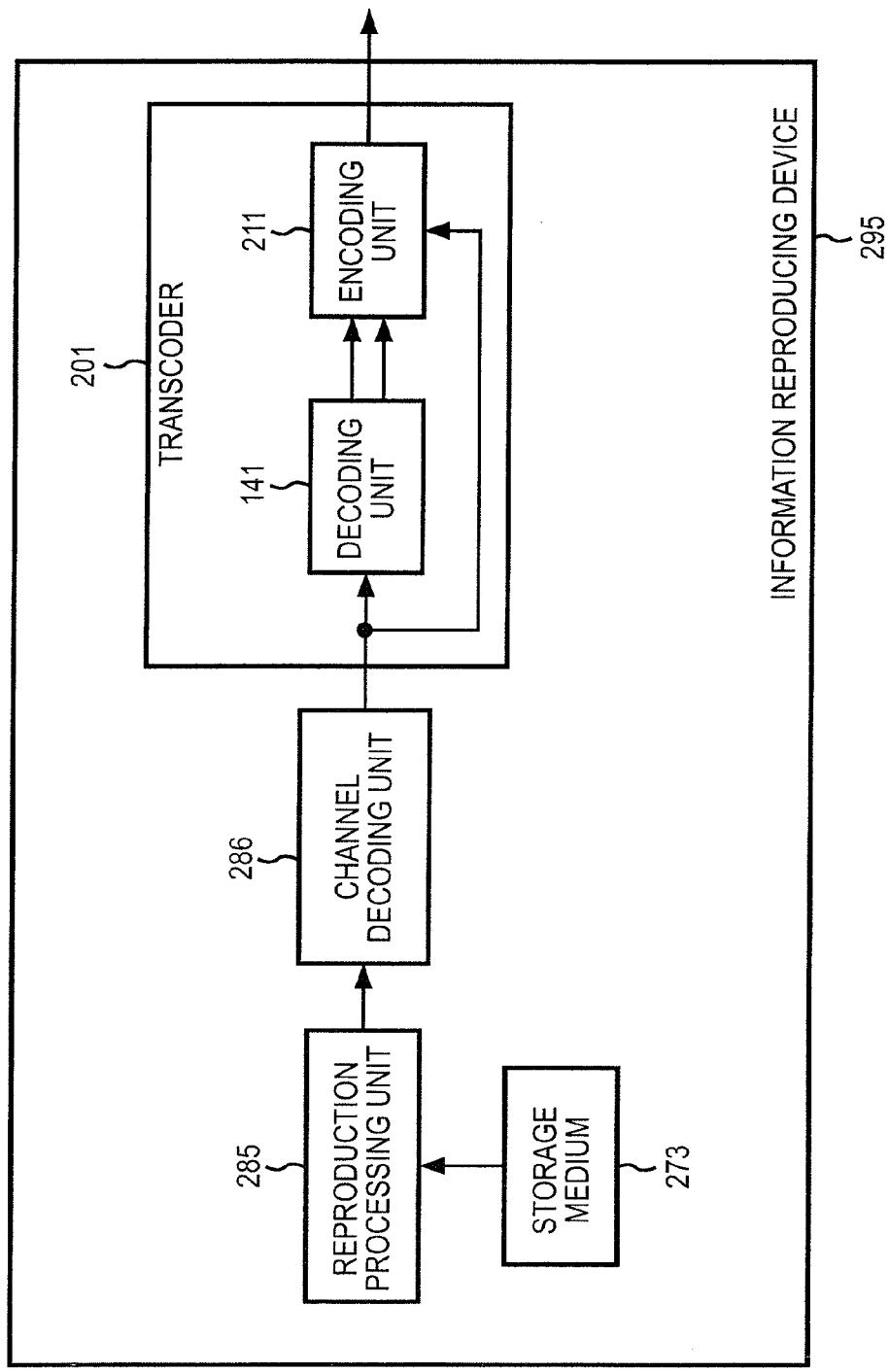
FIG. 16 is a diagram for describing the configuration of an information reproducing device to which the present invention is applicable.

FIG. 16 is a block diagram showing the configuration of an information reproducing device 295 according to the present invention.

The information reproducing device 295 includes a reproduction processing unit 285 for reproducing information from the storage medium 273, a channel decoding unit 286, and the transcoder 201 described with reference to FIGS. 9 and 10.

The reproduction processing unit 285 reproduces information, recorded on the storage medium 273, by a method corresponding to the storage medium 273 and supplies reproduced signals to the channel decoding unit 286. The channel decoding unit 286 performs channel decoding on the reproduction signals, performs error-correction processing using parities, and supplies the reproduction information after the error correction to the transcoder 201. In the same manner described above, the information supplied to the transcoder 201 is processed by the transcoder 201 and is output.

The above described series of processing can be executed by hardware and can also be executed by software. In this case, for example, the transcoder 151 and the transcoder 201 are each implemented with a personal computer 301 as shown in FIG. 17.

Figure 17:
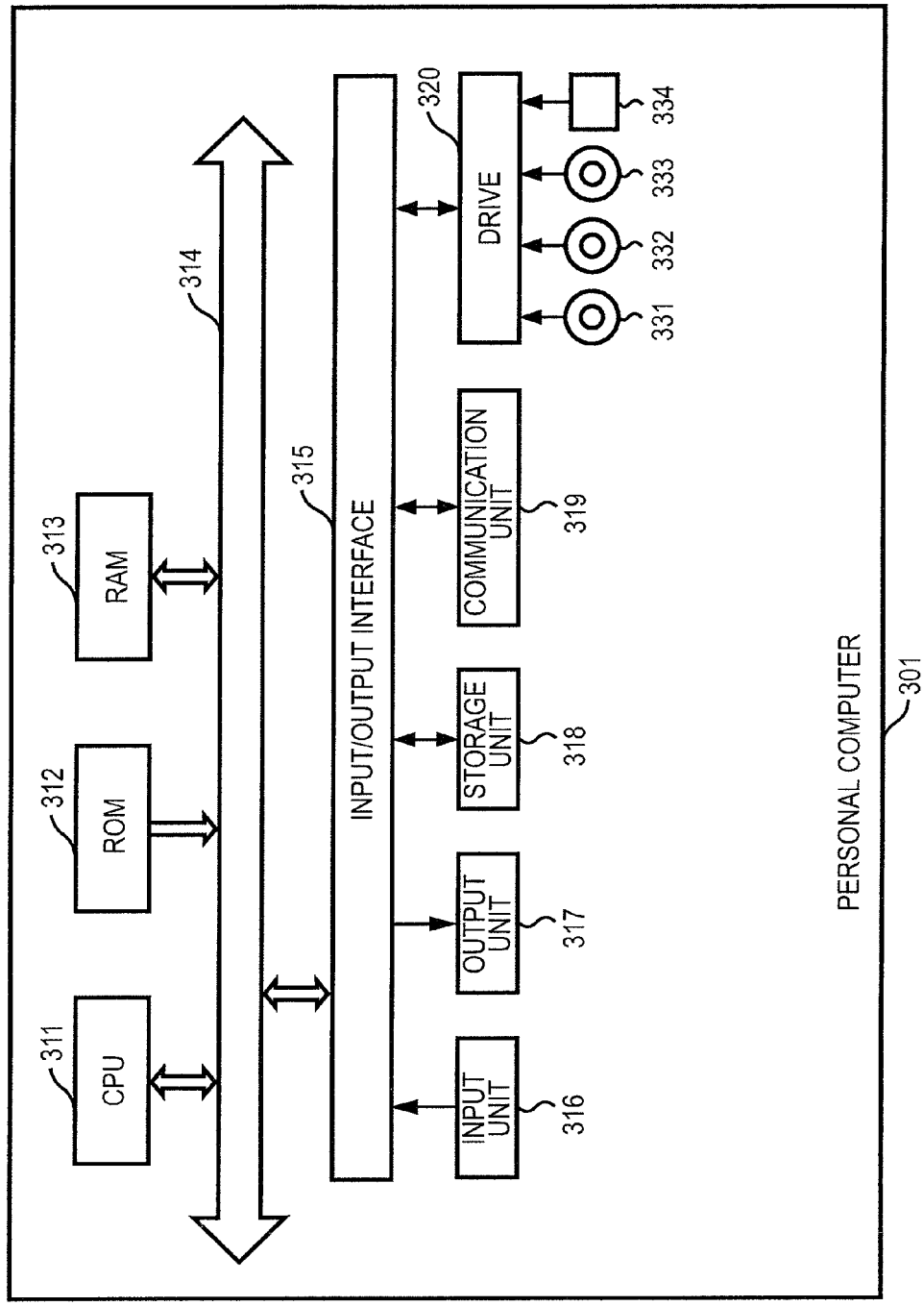
FIG. 17 is a block diagram showing the configuration of a personal computer.

In FIG. 17, a CPU (central processing unit) 311 executes various types of processing in accordance with a program stored in a ROM (read only memory) 312 or a program loaded from a storage unit 318 into a RAM (random access memory) 313. As needed, the RAM 313 also stores, for example, data required for the CPU 311 to execute various types of processing.

The CPU 311, the ROM 312, and the RAM 313 are interconnected through a bus 314. An input/output interface 315 is also connected to the bus 314.

An input unit 316 including a keyboard and a mouse, an output unit 317 including a display and a speaker, the storage unit 318 including a hard disk, and a communication unit 319 including a modem or a terminal adapter are connected to the input/output interface 315. The communication unit 319 performs processing for communication through networks including the Internet.

A drive 320 is also connected to the input/output interface 315 as needed, and, for example, a magnetic disk 331, an optical disk 332, a magneto-optical disk 333, or a semiconductor memory 334 is attached to the drive 320 as appropriate. A computer program read from the disk is installed on the storage unit 318, as needed.

When the series of processing is executed by software, a program for implementing the software is installed from a network or a storage medium onto a computer incorporated into dedicated hardware or onto, for example, a general-purpose personal computer that can execute various functions through installation of various programs.

The storage medium may be a package medium that stores a program and that is distributed separately from the device main unit to supply the program to users. As shown in FIG. 17, an example of the package medium is the magnetic disk 331 (including a floppy disk), the optical disk 332 (including a CD-ROM (compact disk-read only memory) or a DVD (digital versatile disk)), the magneto-optical disk 333 (including an MD (mini-disk) (trademark)), or the semiconductor memory 343. The storage medium may also be the ROM 312 in which a program is stored or the hard disk included in the storage unit 318, the ROM 312 or the hard disk being supplied to users in a state pre-installed in a computer.

Herein, the steps for describing the program recorded on the storage medium not only include processing that is time-sequentially performed according to the included sequence but also include processing that is concurrently or individually executed without being necessarily time-sequentially processed.

The system herein refers to an entire device constituted by a plurality of devices.

INDUSTRIAL APPLICABILITY

As described above, according to the present invention, image data can be encoded. In particular, the present invention obtains information regarding encoding and compares the information with conditions regarding encoding to thereby allow reusable information to be selected from the information regarding the encoding.

Another aspect of the present invention can covert image data, and also obtains information regarding encoding at the time of encoding and compares the information with conditions regarding the encoding to thereby allow reusable information to be selected from the information regarding the encoding.

The invention claimed is:

1. A stream conversion apparatus for converting a first stream that was generated by encoding image data into a second stream, comprising:
   receiving means for receiving the first stream and for receiving information regarding the encoding of the image data;
   conversion means for performing a conversion process of the first stream received by said receiving means into the second stream in accordance with selected information; and
   controlling means for controlling the conversion means to select information from the received information regarding the encoding, based on conditions of the conversion process, for use in said conversion process.

* * * * *